(12) United States Patent
Wu et al.

(10) Patent No.: US 11,443,359 B2
(45) Date of Patent: Sep. 13, 2022

(54) SYSTEM, METHOD, AND COMPUTER PROGRAM PRODUCT FOR SEGMENTING USERS IN A REGION BASED ON PREDICTED ACTIVITY

(71) Applicant: Visa International Service Association, San Francisco, CA (US)

(72) Inventors: Keyuan Wu, Singapore (SG); Dhirender Singh Rathore, Singapore (SG); Vivek Narayanan Nair, North York (CA)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/629,707

(22) PCT Filed: Jul. 10, 2017

(86) PCT No.: PCT/US2017/041303
§ 371 (c)(1),
(2) Date: Jan. 9, 2020

(87) PCT Pub. No.: WO2019/013741
PCT Pub. Date: Jan. 17, 2019

(65) Prior Publication Data
US 2021/0150608 A1 May 20, 2021

(51) Int. Cl.
*G06Q 30/06* (2012.01)
*G06N 20/00* (2019.01)

(52) U.S. Cl.
CPC ........ *G06Q 30/0631* (2013.01); *G06N 20/00* (2019.01)

(58) Field of Classification Search
CPC ............................................. G06Q 30/06–08
See application file for complete search history.

(56) References Cited

U.S. PATENT DOCUMENTS

| 7,835,940 | B2 * | 11/2010 | Kowalchuk | ........ G06Q 30/0203 |
| | | | | 705/7.33 |
| 8,719,094 | B1 | 5/2014 | Klein et al. | |
| 9,471,926 | B2 | 10/2016 | Clyne | |
| 2003/0229897 | A1 | 12/2003 | Frisco et al. | |
| 2007/0061333 | A1 | 3/2007 | Ramer et al. | |
| 2007/0244741 | A1 * | 10/2007 | Blume | ............... G06Q 30/0255 |
| | | | | 705/7.31 |
| 2010/0161379 | A1 * | 6/2010 | Bene | ...................... G06Q 30/02 |
| | | | | 705/7.31 |
| 2101/0161379 | | 6/2010 | Bene et al. | |
| 2011/0225257 | A1 | 9/2011 | Tilden et al. | |
| 2012/0066065 | A1 * | 3/2012 | Switzer | .................. G06Q 20/10 |
| | | | | 705/14.53 |
| 2012/0330714 | A1 | 12/2012 | Malaviya et al. | |
| 2013/0024364 | A1 | 1/2013 | Shrivastava et al. | |

(Continued)

OTHER PUBLICATIONS

"Inflight promotions—how to communicate with passengers onboard?", 2017, PXCom, 11 pages.

(Continued)

*Primary Examiner* — Ming Shui
(74) *Attorney, Agent, or Firm* — The Webb Law Firm

(57) ABSTRACT

A method of segmenting a plurality of users in a first region based on predicted activity external to the first region. A system and computer program product are also provided.

18 Claims, 12 Drawing Sheets

(56) References Cited

U.S. PATENT DOCUMENTS

| | | | |
|---|---|---|---|
| 2013/0046717 A1* | 2/2013 | Grigg | G06Q 30/02 |
| | | | 706/46 |
| 2013/0080239 A1 | 3/2013 | Okerlund | |
| 2013/0191198 A1 | 7/2013 | Carlson et al. | |
| 2013/0218641 A1 | 8/2013 | Graham et al. | |
| 2013/0218713 A1* | 8/2013 | Gottfurcht | G16H 10/60 |
| | | | 705/26.7 |
| 2014/0344069 A1 | 11/2014 | Haggerty et al. | |
| 2015/0026027 A1* | 1/2015 | Priess | G06Q 20/4016 |
| | | | 705/35 |
| 2015/0046220 A1* | 2/2015 | Gerard | G06Q 30/0202 |
| | | | 705/7.31 |
| 2015/0149269 A1 | 5/2015 | Tietzen et al. | |
| 2016/0275595 A1 | 9/2016 | Sharan et al. | |
| 2016/0335641 A1 | 11/2016 | White et al. | |
| 2017/0083928 A1 | 3/2017 | Gerard et al. | |
| 2017/0193550 A1 | 7/2017 | Misra et al. | |

OTHER PUBLICATIONS

Inmarsat aviation, "Advertising, big data and the power of personalisation", 2019, 9 pages, https://www.inmarsataviation.com/benefits/revenue-opportunities/Advertising-big-data-and-the-power-of-personalisation.

* cited by examiner

SYSTEM, METHOD, AND COMPUTER PROGRAM PRODUCT FOR SEGMENTING USERS IN A REGION BASED ON PREDICTED ACTIVITY

CROSS-REFERENCE TO RELATED APPLICATION

This application is the United States national phase of International Application No. PCT/US2017/041303 filed Jul. 10, 2017, the disclosure of which is hereby incorporate by reference in its entirety.

BACKGROUND

Technical Field

The present disclosure relates generally to segmenting users in a region based on predicted activity and, in some non-limiting embodiments or aspects, to a method, system, and apparatus for segmenting a plurality of users in a first region based on predicted activity external to the first region.

Technical Considerations

Portable financial devices, such as credit cards, debit cards, and/or electronic wallet applications, allow users the flexibility to make purchases outside of the user's home country. In contrast, using cash for foreign transactions often requires users to first go to a financial institution to exchange home currency for foreign currency, which can include additional fees imposed by the financial institution for performing the currency exchange.

However, in order to provide users protection from fraud, transaction service providers have developed methods of monitoring user accounts for activity that may indicate fraud. One such activity that may indicate fraud is a transaction conducted in a foreign country without the user having first placed a foreign travel notice on the account. Therefore, without a traveler providing a foreign travel notice to the portable financial device issuing institution and/or transaction service provider, the traveler may raise a fraud alert by making a legitimate purchase with the portable financial device in a foreign country.

Because users traveling to foreign countries are away from their homes, their spending may oftentimes be increased for the duration of the travel. For instance, travelers often purchase meals, transportation, overnight accommodations, souvenirs, and items unintentionally left at home (e.g., clothing, toiletries, and/or the like) more frequently compared to when not traveling. Thus, overall, spending while traveling in a foreign country may be increased for many users, making benefits provided by portable financial device issuing institutions and/or transaction service providers more useful to travelers.

Therefore, there is a need in the art for portable financial device issuing institutions and/or transaction service providers to be able to determine a user's propensity to make purchases in a foreign country using their portable financial device. Being able to determine this travel propensity allows the issuing institutions and/or transaction service providers to avoid false fraud alerts from a user's legitimate foreign transactions and to offer the user timely travel benefits and/or incentives.

SUMMARY

Accordingly, provided are improved methods, systems, and apparatus for automatically initiating at least one target action for at least one target user in a first region having a propensity for initiating transaction activity in at least one second region.

According to some non-limiting embodiments or aspects, provided is a method of segmenting a plurality of users in a first region based on predicted activity external to the first region. The method includes determining, with at least one processor, a first subset of users from the plurality of users, the first subset of users including users that have previously used a portable device in at least one second region to initiate a transaction at least a predetermined number of times, where the at least one second region is external to the first region. The method includes determining, with at least one processor, a second subset of users from the plurality of users, the second subset of users including users that have not previously used a portable device to initiate a transaction in the at least one second region or have used a portable device to initiate a transaction in the at least one second region less than a predetermined number of times. The method includes generating, with at least one processor, an activation metric for each user of the first subset of users based at least partially on a first algorithm, a first plurality of transaction parameters, and transaction data for portable device transactions initiated by each user. The method includes generating, with at least one processor, an activation metric for each user of the second subset of users based at least partially on a second algorithm, a second plurality of transaction parameters, and transaction data for portable financial device transactions initiated by each user. The method includes determining, with at least one processor, a plurality of target users from the plurality of users based at least partially on the activation metrics, the plurality of target users having a propensity for initiating transaction activity in the at least one second region. The method includes automatically initiating, with at least one processor, at least one target action for each user of the plurality of target users.

According to some non-limiting embodiments or aspects, provided is a system for segmenting a plurality of users in a first region based on predicted activity external to the first region, including at least one server computer including at least one processor, the at least one server computer programmed or configured to: (i) determine a first subset of users from the plurality of users, the first subset of users including users that have previously used a portable device in at least one second region to initiate a transaction at least a predetermined number of times, where the at least one second region is external to the first region; (ii) determine a second subset of users from the plurality of users, the second subset of users including users that have not previously used a portable device to initiate a transaction in the at least one second region or have used a portable device to initiate a transaction in the at least one second region less than a predetermined number of times; (iii) generate an activation metric for each user of the first subset of users based at least partially on a first algorithm, a first plurality of transaction parameters, and transaction data for portable device transactions initiated by each user; (iv) generate an activation metric for each user of the second subset of users based at least partially on a second algorithm, a second plurality of transaction parameters, and transaction data for portable financial device transactions initiated by each user; (v) determine a plurality of target users from the plurality of users based at least partially on the activation metrics, the plurality of target users having a propensity for initiating transaction activity in the at least one second region; and (vi)

automatically initiate at least one target action for each user of the plurality of target users.

According to some non-limiting embodiments or aspects, provided is a computer program product for segmenting a plurality of users in a first region based on predicted activity external to the first region, including at least one non-transitory computer-readable medium including program instructions that, when executed by at least one computer including at least one processor, cause the at least one processor to: (i) determine a first subset of users from the plurality of users, the first subset of users including users that have previously used a portable device in at least one second region to initiate a transaction at least a predetermined number of times, where the at least one second region is external to the first region; (ii) determine a second subset of users from the plurality of users, the second subset of users including users that have not previously used a portable device to initiate a transaction in the at least one second region or have used a portable device to initiate a transaction in the at least one second region less than a predetermined number of times; (iii) generate an activation metric for each user of the first subset of users based at least partially on a first algorithm, a first plurality of transaction parameters, and transaction data for portable device transactions initiated by each user; (iv) generate an activation metric for each user of the second subset of users based at least partially on a second algorithm, a second plurality of transaction parameters, and transaction data for portable financial device transactions initiated by each user; (v) determine a plurality of target users from the plurality of users based at least partially on the activation metrics, the plurality of target users having a propensity for initiating transaction activity in the at least one second region; and (v) automatically initiate at least one target action for each user of the plurality of target users.

According to some non-limiting embodiments or aspects, provided is a method of segmenting a plurality of users in a first region based on predicted activity external to the first region. The method includes determining, with at least one processor, a plurality of transaction parameters associated with a propensity to conduct transactions in at least one second region external to the first region based at least partially on prior transaction data. The method includes generating, with at least one processor, a predictive model based at least partially on the plurality of transaction parameters and the prior transaction data. The method includes generating, with at least one processor, an activation metric for each user of the plurality of users based at least partially on the predictive model and transaction data for portable financial device transactions initiated by the user. The method includes determining, with at least one processor and based at least partially on the activation metrics for each user, a plurality of target users from the plurality of users, the plurality of target users having a propensity for conducting transactions in the at least one second region. The method includes automatically initiating, with at least one processor, at least one target action for each user of the plurality of target users.

According to some non-limiting embodiments or aspects, provided is a method of segmenting a plurality of users based on predicted usage of a transaction mechanism, comprising: determining, with at least one processor, a plurality of transaction parameters associated with a propensity to conduct future transactions with a specific transaction mechanism based at least partially on prior transaction data; generating, with at least one processor, a predictive model based at least partially on the plurality of transaction parameters and the prior transaction data; generating, with at least one processor, an activation metric for each account holder of the plurality of account holders based at least partially on the predictive model and transaction data for transactions initiated by the account holder; determining, with at least one processor and based at least partially on the activation metric for each account holder, a plurality of target account holders from the plurality of account holders, the plurality of target account holders having a propensity for conducting transactions with the specific transaction mechanism; and automatically initiating, with at least one processor, at least one target action for each account holder of the plurality of target account holders.

Further non-limiting embodiments or aspects are set forth in the following numbered clauses:

Clause 1: A method of segmenting a plurality of users in a first region based on predicted activity external to the first region, comprising: determining, with at least one processor, a first subset of users from the plurality of users, the first subset of users comprising users that have previously used a portable device in at least one second region to initiate a transaction at least a predetermined number of times, wherein the at least one second region is external to the first region; determining, with at least one processor, a second subset of users from the plurality of users, the second subset of users comprising users that have not previously used a portable device to initiate a transaction in the at least one second region or have used a portable device to initiate a transaction in the at least one second region less than a predetermined number of times; generating, with at least one processor, an activation metric for each user of the first subset of users based at least partially on a first algorithm, a first plurality of transaction parameters, and transaction data for portable device transactions initiated by each user; generating, with at least one processor, an activation metric for each user of the second subset of users based at least partially on a second algorithm, a second plurality of transaction parameters, and transaction data for portable financial device transactions initiated by each user; determining, with at least one processor, a plurality of target users from the plurality of users based at least partially on the activation metrics, the plurality of target users having a propensity for initiating transaction activity in the at least one second region; and automatically initiating, with at least one processor, at least one target action for each user of the plurality of target users.

Clause 2: The method of clause 1, wherein at least one of the first algorithm and the second algorithm comprises a machine learning algorithm configured to apply at least one predictive model to the transaction data for each user.

Clause 3: The method of clause 1 or 2, wherein the at least one target action comprises: identifying at least one offer for each user of the plurality of target users; and communicating the at least one offer to the user.

Clause 4: The method of any of the preceding clauses, wherein the at least one target action comprises approving a user of the plurality of target users for transactions in the at least one second region.

Clause 5: The method of any of the preceding clauses, wherein the at least one target action comprises: generating at least one list of at least a portion of the plurality of target users associated with a first issuing institution; and communicating the at least one list to the first issuing institution.

Clause 6: The method of any of the preceding clauses, wherein the first region comprises a country or territory associated with each of the plurality of users, and wherein the at least one second region comprises all countries and/or territories external to the first region.

Clause 7: The method of any of the preceding clauses, wherein at least one of the first plurality of transaction parameters and the second plurality of transaction parameters comprises at least one of the following: a frequency of transactions, a transaction spend, a frequency of electronic commerce transactions, a frequency of airline transactions, a frequency of travel service transactions, a frequency of lodging transactions, a frequency of retail transactions, a frequency of restaurant transactions, a frequency of general retail transactions, a frequency of apparel retail transactions, a frequency of transactions in the at least one second region, a transaction spend in the at least one second region, a consistency of transactions in the at least one second region, or any combination thereof.

Clause 8: The method of any of the preceding clauses, wherein at least one of the first plurality of transaction parameters and the second plurality of transaction parameters comprises at least one external parameter, the at least one external parameter comprising at least one of the following: a change in currency exchange, a holiday or event schedule in at least one of the first region and the at least one second region, a time of year, or any combination thereof.

Clause 9: A system for segmenting a plurality of users in a first region based on predicted activity external to the first region, comprising at least one server computer including at least one processor, the at least one server computer programmed or configured to: determine a first subset of users from the plurality of users, the first subset of users comprising users that have previously used a portable device in at least one second region to initiate a transaction at least a predetermined number of times, wherein the at least one second region is external to the first region; determine a second subset of users from the plurality of users, the second subset of users comprising users that have not previously used a portable device to initiate a transaction in the at least one second region or have used a portable device to initiate a transaction in the at least one second region less than a predetermined number of times; generate an activation metric for each user of the first subset of users based at least partially on a first algorithm, a first plurality of transaction parameters, and transaction data for portable device transactions initiated by each user; generate an activation metric for each user of the second subset of users based at least partially on a second algorithm, a second plurality of transaction parameters, and transaction data for portable financial device transactions initiated by each user; determine a plurality of target users from the plurality of users based at least partially on the activation metrics, the plurality of target users having a propensity for initiating transaction activity in the at least one second region; and automatically initiate at least one target action for each user of the plurality of target users Clause 10: The system of clause 9, further comprising at least one database in communication with the at least one server, the at least one database comprising the transaction data for the portable device transactions initiated by each user of the plurality of users.

Clause 11: The system of clause 9 or 10, wherein at least one of the first algorithm and the second algorithm comprises a machine learning algorithm configured to apply at least one predictive model to the transaction data for each user.

Clause 12: The system of any of clauses 9-11, wherein the at least one target action comprises: identifying at least one offer for each user of the plurality of target users; and communicating the at least one offer to the user.

Clause 13: The system of any of clauses 9-12, wherein the at least one target action comprises approving a user of the plurality of target users for transactions in the at least one second region.

Clause 14: The system of any of clauses 9-13, wherein the at least one target action comprises: generating at least one list of at least a portion of the plurality of target users associated with a first issuing institution; and communicating the at least one list to the first issuing institution.

Clause 15: The system of any of clauses 9-14, wherein the first region comprises a country or territory associated with each of the plurality of users, and wherein the at least one second region comprises all countries and/or territories external to the first region.

Clause 16: The system of any of clauses 9-15, wherein at least one of the first plurality of transaction parameters and the second plurality of transaction parameters comprises at least one of the following: a frequency of transactions, a transaction spend, a frequency of electronic commerce transactions, a frequency of airline transactions, a frequency of travel service transactions, a frequency of lodging transactions, a frequency of retail transactions, a frequency of restaurant transactions, a frequency of general retail transactions, a frequency of apparel retail transactions, a frequency of transactions in the at least one second region, a transaction spend in the at least one second region, a consistency of transactions in the at least one second region, or any combination thereof.

Clause 17: The system of any of clauses 9-16, wherein at least one of the first plurality of transaction parameters and the second plurality of transaction parameters comprises at least one external parameter, the at least one external parameter comprising at least one of the following: a change in currency exchange, a holiday or event schedule in at least one of the first region and the at least one second region, a time of year, or any combination thereof.

Clause 18: A computer program product for segmenting a plurality of users in a first region based on predicted activity external to the first region, comprising at least one non-transitory computer-readable medium including program instructions that, when executed by at least one computer comprising at least one processor, cause the at least one processor to: determine a first subset of users from the plurality of users, the first subset of users comprising users that have previously used a portable device in at least one second region to initiate a transaction at least a predetermined number of times, wherein the at least one second region is external to the first region; determine a second subset of users from the plurality of users, the second subset of users comprising users that have not previously used a portable device to initiate a transaction in the at least one second region or have used a portable device to initiate a transaction in the at least one second region less than a predetermined number of times; generate an activation metric for each user of the first subset of users based at least partially on a first algorithm, a first plurality of transaction parameters, and transaction data for portable device transactions initiated by each user; generate an activation metric for each user of the second subset of users based at least partially on a second algorithm, a second plurality of transaction parameters, and transaction data for portable financial device transactions initiated by each user; determine a plurality of target users from the plurality of users based at least partially on the activation metrics, the plurality of target users having a propensity for initiating transaction activity in the at least one second region; and automatically initiate at least one target action for each user of the plurality of target users.

Clause 19: The computer program product of clause 18, wherein at least one of the first algorithm and the second algorithm comprises a machine learning algorithm configured to apply at least one predictive model to the transaction data for each user.

Clause 20: The computer program product of clause 18 or 19, wherein the at least one target action comprises: identifying at least one offer for each user of the plurality of target users; and communicating the at least one offer to the user.

Clause 21: The computer program product of any of clauses 18-20, wherein the at least one target action comprises approving a user of the plurality of target users for transactions in the at least one second region.

Clause 22: The computer program product of any of clauses 18-21, wherein the at least one target action comprises: generating at least one list of at least a portion of the plurality of target users associated with a first issuing institution; and communicating the at least one list to the first issuing institution.

Clause 23: The computer program product of any of clauses 18-22, wherein the first region comprises a country or territory associated with each of the plurality of users, and wherein the at least one second region comprises all countries and/or territories external to the first region.

Clause 24: The computer program product of any of clauses 18-23, wherein at least one of the first plurality of transaction parameters and the second plurality of transaction parameters comprises at least one of the following: a frequency of transactions, a transaction spend, a frequency of electronic commerce transactions, a frequency of airline transactions, a frequency of travel service transactions, a frequency of lodging transactions, a frequency of retail transactions, a frequency of restaurant transactions, a frequency of general retail transactions, a frequency of apparel retail transactions, a frequency of transactions in the at least one second region, a transaction spend in the at least one second region, a consistency of transactions in the at least one second region, or any combination thereof.

Clause 25: The computer program product of any of clauses 18-25, wherein at least one of the first plurality of transaction parameters and the second plurality of transaction parameters comprises at least one external parameter, the at least one external parameter comprising at least one of the following: a change in currency exchange, a holiday or event schedule in at least one of the first region and the at least one second region, a time of year, or any combination thereof.

Clause 26: A method of segmenting a plurality of users in a first region based on predicted activity external to the first region, comprising: determining, with at least one processor, a plurality of transaction parameters associated with a propensity to conduct transactions in at least one second region external to the first region based at least partially on prior transaction data; generating, with at least one processor, a predictive model based at least partially on the plurality of transaction parameters and the prior transaction data; generating, with at least one processor, an activation metric for each user of the plurality of users based at least partially on the predictive model and transaction data for portable financial device transactions initiated by the user; determining, with at least one processor and based at least partially on the activation metrics for each user, a plurality of target users from the plurality of users, the plurality of target users having a propensity for conducting transactions in the at least one second region; and automatically initiating, with at least one processor, at least one target action for each user of the plurality of target users.

Clause 27: The method of clause 26, further comprising: determining, with at least one processor, a plurality of transaction parameters associated with a propensity to conduct future transactions with a specific transaction mechanism based at least partially on prior transaction data; generating, with at least one processor, a second predictive model based at least partially on the plurality of transaction parameters associated with a propensity to conduct future transactions with a specific transaction mechanism and the prior transaction data; generating, with at least one processor, a transaction mechanism propensity metric for each account holder of the second plurality of account holders based at least partially on the second predictive model and transaction data for transactions initiated by the account holder; determining, with at least one processor and based at least partially on the transaction mechanism propensity metric for each account holder, a second plurality of target account holders from the second plurality of account holders, the second plurality of target account holders having a propensity for conducting transactions with the specific transaction mechanism; and automatically initiating, with at least one processor, at least one second target action for each account holder of the second plurality of target account holders.

Clause 28: A method of segmenting a plurality of users based on predicted usage of a transaction mechanism, comprising: determining, with at least one processor, a plurality of transaction parameters associated with a propensity to conduct future transactions with a specific transaction mechanism based at least partially on prior transaction data; generating, with at least one processor, a predictive model based at least partially on the plurality of transaction parameters and the prior transaction data; generating, with at least one processor, an activation metric for each account holder of the plurality of account holders based at least partially on the predictive model and transaction data for transactions initiated by the account holder; determining, with at least one processor and based at least partially on the activation metric for each account holder, a plurality of target account holders from the plurality of account holders, the plurality of target account holders having a propensity for conducting transactions with the specific transaction mechanism; and automatically initiating, with at least one processor, at least one target action for each account holder of the plurality of target account holders.

Clause 29: The method of clause 28, wherein the at least one target action comprises: identifying at least one offer for each user of the plurality of target users; and communicating the at least one offer to the user.

Clause 30: The method of clauses 28 or 29, wherein the at least one target action comprises: generating at least one list of at least a portion of the plurality of target users associated with a first issuing institution; and communicating the at least one list to the first issuing institution.

Clause 31: A system of segmenting a plurality of users based on predicted usage of a transaction mechanism, comprising at least one processor programmed or configured to determine a plurality of transaction parameters associated with a propensity to conduct future transactions with a specific transaction mechanism based at least partially on prior transaction data; generate a predictive model based at least partially on the plurality of transaction parameters and the prior transaction data; generate an activation metric for each account holder of the plurality of account holders based at least partially on the predictive model and transaction data for transactions initiated by the account holder; determine, based at least partially on the activation metric for each account holder, a plurality of target account holders from the plurality of account holders, the plurality of target account holders having a propensity for conducting transactions with the specific transaction mechanism; and automatically initiate at least one target action for each account holder of the plurality of target account holders.

Clause 32: The system of clause 31, wherein the at least one target action comprises: identifying at least one offer for each user of the plurality of target users; and communicating the at least one offer to the user.

Clause 33: The system of clauses 31 or 32, wherein the at least one target action comprises: generating at least one list of at least a portion of the plurality of target users associated with a first issuing institution; and communicating the at least one list to the first issuing institution.

These and other features and characteristics of the present disclosure, as well as the methods of operation and functions of the related elements or structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
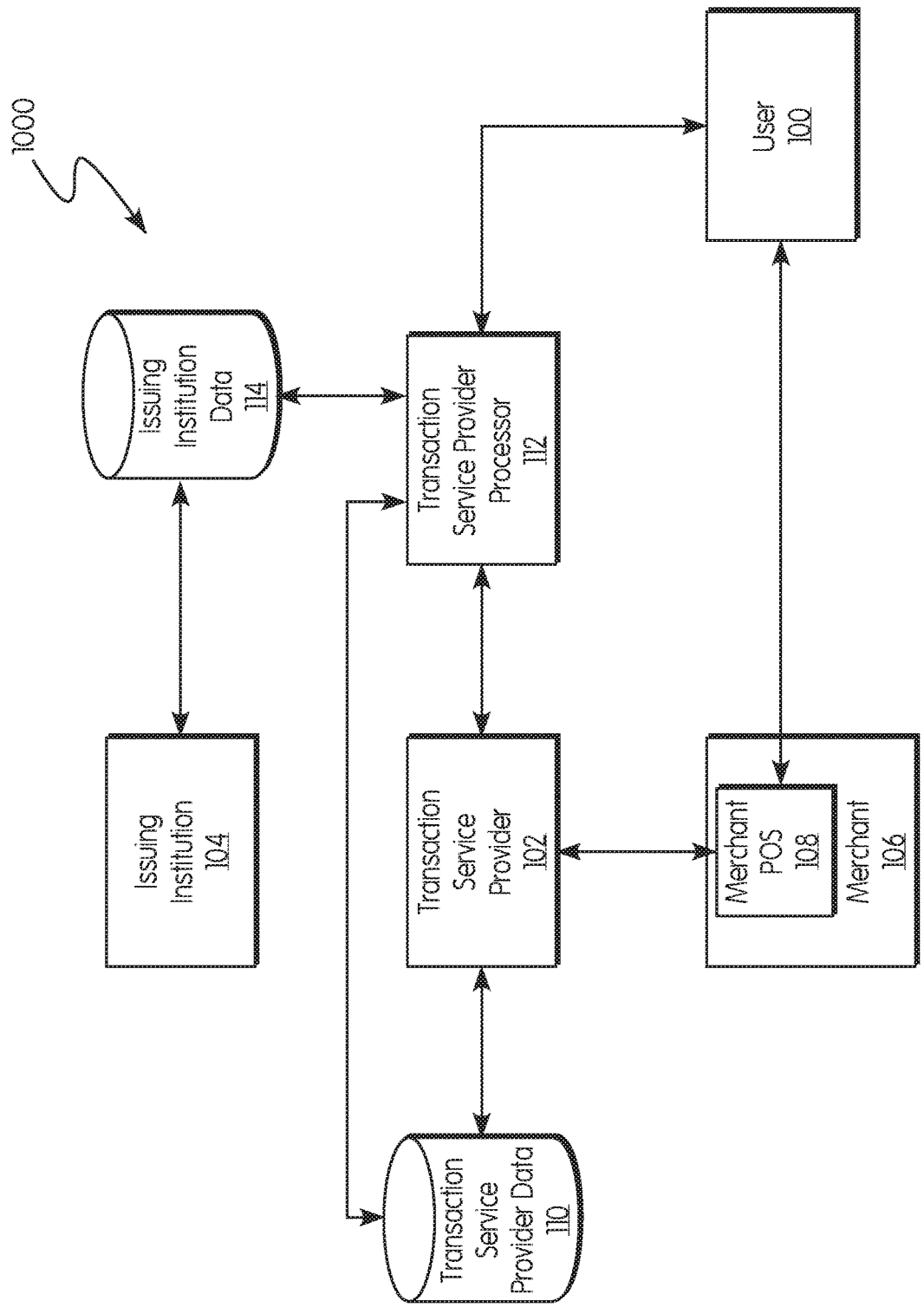
FIG. 1 is a schematic diagram of a system for segmenting a plurality of users in a first region based on predicted activity external to the first region according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "portable financial device" or "portable device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet application, a personal digital assistant, a pager, a security card, a computer, an access card, a wireless terminal, and/or a transponder, as examples. The portable financial device may include a volatile or a non-volatile memory to store information, such as an account identifier or a name of an account holder. A portable financial device transaction may refer to a transaction initiated with a portable financial device and an account identifier.

As used herein, the terms "issuing institution," "portable financial device issuer," "issuer," or "issuer bank" may refer to one or more entities that provide accounts to customers for conducting payment transactions, such as initiating credit and/or debit payments. For example, an issuing institution may provide an account identifier, such as a personal account number (PAN), to a customer that uniquely identifies one or more accounts associated with that customer. The account identifier may be embodied on a portable financial device such as a physical financial instrument, e.g., a payment card, and/or may be electronic and used for electronic payments. As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they may be used to conduct a transaction without directly using the original account identifier. In some examples, an original account identifier, such as a PAN, may be associated with a plurality of tokens for different individuals or purposes. An issuing institution may be associated with a bank identification number (BIN) that uniquely identifies it. The terms "issuing institution" and "issuing institution system" may also refer to one or more computer systems operated by or on behalf of an issuing institution, such as a server computer executing one or more software applications. For example, an issuing institution system may include one or more authorization servers for authorizing a payment transaction.

As used herein, the term "merchant" refers to an individual or entity that provides goods and/or services, or access to goods and/or services, to customers based on a transaction, such as a payment transaction. The term "merchant" may also refer to one or more computer systems operated by or on behalf of a merchant, such as a server computer executing one or more software applications. As used herein, a "merchant point-of-sale (POS) system" may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that may be used to initiate a payment transaction. A merchant POS system may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuing institution.

Non-limiting embodiments of the present disclosure are directed to a method, system, and apparatus for segmenting users in a first region based on activity external to the first region. Non-limiting embodiments of the disclosure allow for issuing institutions or transaction service providers to more efficiently determine each user's propensity to make purchases from foreign merchants using their portable financial device. Thus, the disclosure allows issuing institutions and/or transaction service providers to avoid false fraud alerts from a user's legitimate foreign transactions and to offer the user timely travel benefits and/or incentives.

Referring now to FIG. 1, a system 1000 for segmenting a plurality of users in a first region based on predicted activity external to the first region is shown according to some non-limiting embodiments or aspects. A user 100 may be a holder of a portable financial device (e.g., an account holder) associated with a transaction service provider 102 and issued to the user 100 by an issuing institution 104. In some non-limiting embodiments or aspects, the user 100 is a holder of a portable financial device issued by an issuing institution 104. The user 100 may use the portable financial device to initiate financial transactions with various merchants 106 using a merchant POS 108, which communicates with the transaction service provider 102 to complete payment of the financial transactions. In some non-limiting embodiments or aspects, the user 100 may purchase goods or services from the merchant 106 using a portable financial device and the merchant POS 108 to guarantee payment for the goods and/or services by authorization requests approved by the transaction service provider 102.

With continued reference to FIG. 1, the user 100 may reside in a first region. As used herein, the term "reside" may mean that the user 100 is a citizen, permanent resident, or non-permanent resident in the first region. The user 100 may live at an address in the first region, and the user's account may be associated with that address. A user account may be associated with an address, residence, or place of business. The user 100 may be a holder of a portable financial device in the first region. For instance, the user's 100 mailing address and/or billing address may be located in the first region. The first region may be any definable geographic region. In some non-limiting embodiments or aspects, the first region is a neighborhood, township, town, municipality, borough, city, district, county, parish, state, commonwealth, province, territory, colony, country, continent, hemisphere, or some collection or combination thereof. The first region may also be any other arbitrarily defined geographical area, as determined by the transaction service provider 102 or the issuing institution 104. At least one second region may be defined as an area geographically outside of (external to) the first region. In some non-limiting embodiments or aspects, the first region is a specific first country associated with a user account, and the second region is every other country except the first country, such as the first region being the United States of America and the second region being all other countries. In some non-limiting embodiments or aspects, the first region is a specific first state, and the second region is every other state except the first state, as well as every other country, such as the first region being Pennsylvania and the second region being all other states in the United States of America, as well as every other country. In some examples, the second region may be a subset of regions external to the first region.

The merchant 106 selling goods or services to the user 100 may be a domestic merchant or a foreign merchant. "Domestic merchant" may refer to a merchant 106 located in or initiating a transaction in the first region associated with the user 100. "Foreign merchant" may refer to a merchant 106 located in or initiating a transaction in the second region associated with the user 100. Whether the merchant 106 is a domestic merchant or a foreign merchant may depend on the location at which the transaction between the user 100 and the merchant 106 is considered to take place. For instance, a transaction may be considered to take place at a brick-and-mortar location (whether it be in the first region or second region associated with the user 100) of the merchant 106 if the user 100 is physically present in the brick-and-mortar location to initiate the transaction. For instance, a transaction may be considered to take place in the first region of the user 100 when the transaction is initiated online and billed and/or shipped to the user's 100 address in the first region 100. However, any other relevant transaction scenario may be considered when determining the location of the transaction.

In the example system 1000 shown in FIG. 1, the merchant POS 108 may communicate with the transaction service provider 102 during financial transactions between the user 100 and the merchant 106. During these transactions, the transaction service provider 102 may collect transaction data relating to the financial transactions and communicate that data to a transaction service provider database 110. The transaction service provider database 110 may be located at the transaction service provider 102 or elsewhere. Over time, the transaction service provider database 110 may store historical transaction data (e.g., prior transaction data) and other information about a plurality of users who use portable financial devices associated with the transaction service provider 102. For instance, the transaction service provider 102 may collect various information about each of its account holders, including information about each purchase or each non-purchase transaction (e.g., an automated teller machine transaction or account funding transfer transaction) that account holder has made using the portable financial device associated with the transaction service provider 102. This historical transaction data may be analyzed later by the transaction service provider 102.

In some non-limiting embodiments or aspects, the transaction service provider database 110 may include data associated with the following categories of transaction data: overall usage of portable financial device, usage of portable financial device on travel and entertainment, usage of portable financial device on retail, past cross-border behavior usage. These categories of transaction data may further include transaction parameters. In some non-limiting embodiments or aspects, the transaction parameters of the transaction categories may include: a frequency of transactions, a transaction spend, a consistency of usage, a frequency or amount of electronic commerce transactions, a frequency or amount of airline transactions, a frequency or amount of travel service transactions, a frequency or amount of lodging transactions, a frequency or amount of retail transactions, a frequency or amount of restaurant transactions, a frequency or amount of general retail transactions, a frequency or amount of apparel retail transactions, a frequency of transactions in the at least one second region, a transaction spend in the at least one second region, a consistency of transactions in the at least one second region, past travel behavior, merchant preferences, amount or frequency of seasonal purchases, number of channels though which user has initiated a transaction, spend behavior, or any combination thereof. It will be appreciated that this list of categories of transaction data and/or transaction parameters within the categories of transaction data is not limited to the above list, and any relevant parameters may also be included.

Another category of transaction data may include external factors, which may not be stored in the transaction service provider database 110. The external factors category may include transaction parameters (also referred to as external transaction parameters) including: a change in currency exchange (such as exchange rate), a holiday or event schedule in at least one of the first region and the at least one second region, a time of year, or any combination thereof. These parameters may be predetermined and/or obtained from one or more third party sources, such as government databases.

With continued reference to FIG. 1, the example system 1000 may include a transaction service provider processor 112 owned and/or controlled by or on behalf of the transaction service provider 102. The transaction service provider processor 112 may be located at the transaction service provider 102 or elsewhere. The transaction service provider database 110 may be in communication with the transaction service provider 102 and/or the transaction service provider processor 112. In some non-limiting embodiments or aspects, the transaction service provider processor 112 may be a separate computer system or, in other examples, may be part of the transaction service provider 102.

The transaction service provider processor 112 may also be in communication with an issuing institution database 114 which, like the transaction service provider database 110, may include information about each user. The issuing institution database 114 may be located at the issuing institution 104 or elsewhere. The issuing institution database 114 may include information about each user collected by the issuing institution 104. In some non-limiting embodiments or aspects, the issuing institution database 114 may include the following information: personal information (e.g., name, age, gender, mailing address, phone number, email address, social security number, driver's license number, marital status, occupation, and/or the like) and/or various financial information (e.g., credit score, credit score history, bank account number, account identifier, monthly salary, yearly salary, and/or the like). Some of the information in the transaction service provider database 110 and the issuing institution database 114 may be duplicative.

In some non-limiting embodiments or aspects of the system 1000 shown in FIG. 1, in response to segmenting a user, the transaction service provider processor 112 may automatically initiate at least one target action by communicating with the user 100 or some group of target users. Such communication may include a web-based communication, an email communication, a text message, a telephone call, a push notification, and/or an instant message. The transaction service provider processor 112 may identify at least one offer for the user 100 and communicate that offer to that user. The offer may be any benefit, such as a discount, coupon, cash back, promotional item, sweepstakes, or any other incentive to the user 100. The offer may be related to travel, such as an offer for typical travel products and/or services, or offers for products and/or services typical for use or purchase in the second region. The communication may also be informational or associated with incentivizing the user 100 to use the portable financial device in connection with travel in the second region. The user 100 may also communicate with the transaction service provider processor 112 using like communication methods.

Figure 2:
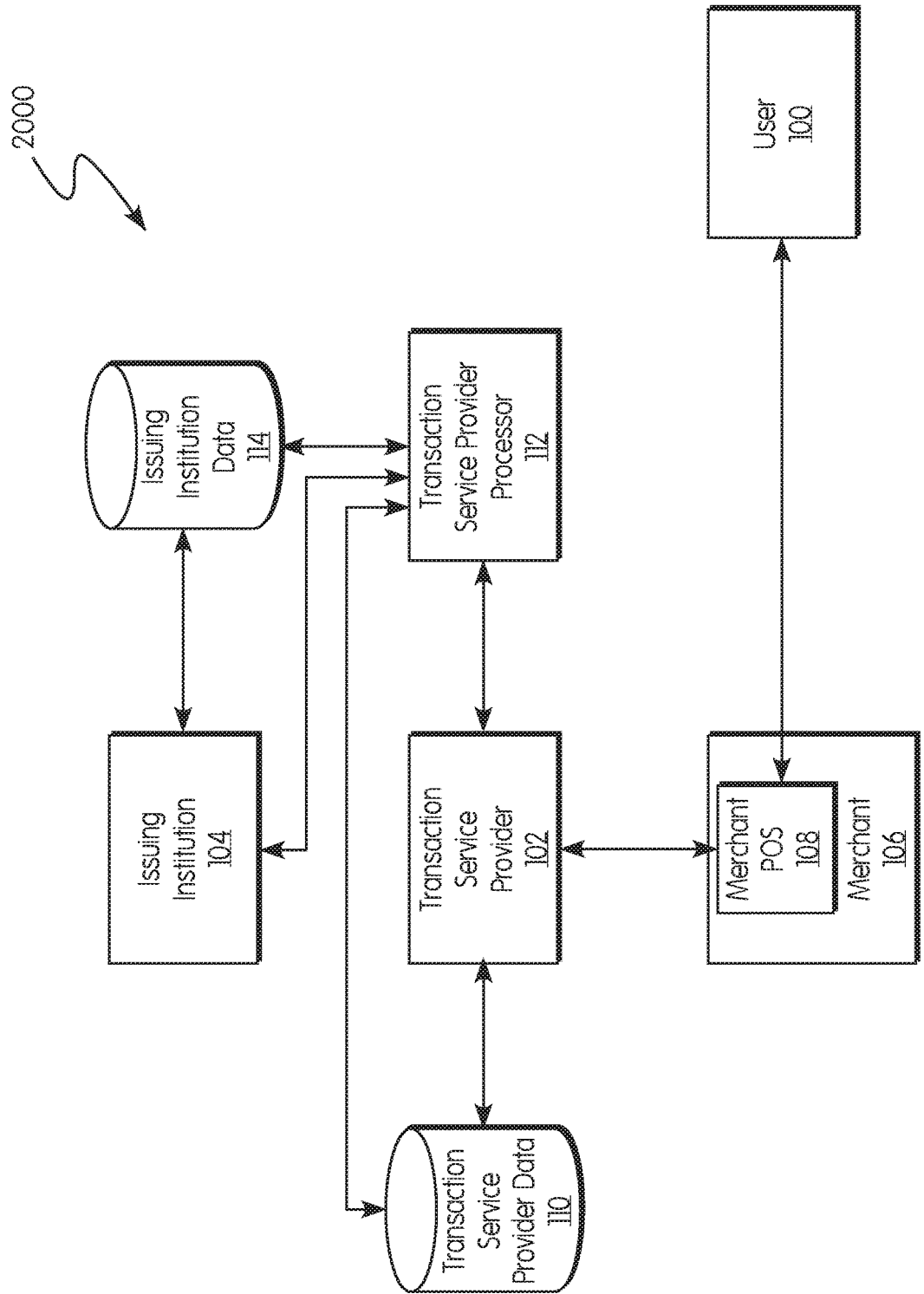
FIG. 2 is another schematic diagram of a system for segmenting a plurality of users in a first region based on predicted activity external to the first region according to some non-limiting embodiments or aspects.

Referring to FIG. 2, a system 2000 for segmenting a plurality of users in a first region based on predicted activity external to the first region is shown according to some non-limiting embodiments or aspects. The components of the system 2000 in FIG. 2 include all of the capabilities and characteristics of the components from the system 1000 of FIG. 1 having like reference numbers. In some non-limiting embodiments or aspects of the system 2000 shown in FIG. 2, the transaction service provider processor 112 may initiate at least one target action by communicating with the issuing institution 104 (or a processor thereof) or the issuing institution database 114. The issuing institution database 114 may be hosted by or on behalf of the issuing institution 104. In some non-limiting embodiments or aspects, the transaction service provider processor 112 generates at least one list of target users associated with the issuing institution 104 and communicates that list of target users to the issuing institution 104 or the issuing institution database 114. The issuing institution 104 may take a further target action based on the list.

Figure 3:
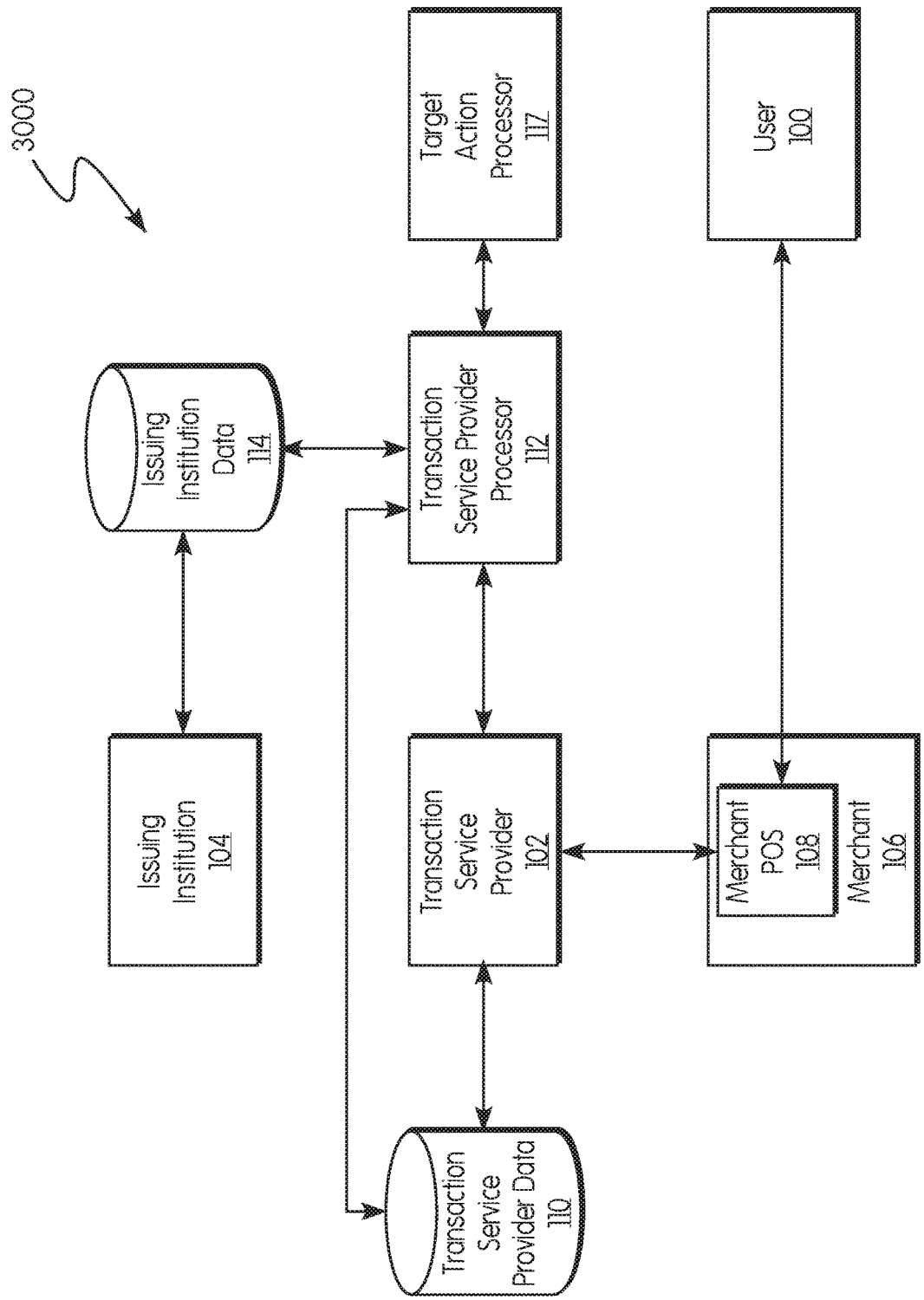
FIG. 3 is another schematic diagram of a system for segmenting a plurality of users in a first region based on predicted activity external to the first region according to some non-limiting embodiments or aspects.

Referring to FIG. 3, a system 3000 for segmenting a plurality of users in a first region based on predicted activity external to the first region is shown according to some non-limiting embodiments or aspects. The components of the system 3000 in FIG. 3 include all of the capabilities and characteristics of the components from the system 1000 of FIG. 1 having like reference numbers. In some non-limiting embodiments of the system 3000 shown in FIG. 3, the transaction service processor 112 may initiate a target action by transmitting a signal to a target action processor 117. The target action processor 117 may be a separate computer system or, in other examples, may be a part of the transaction service provider processor 112. This target action may include automatically approving a user of a plurality of target users for transactions in the at least one second region. This approval may be advantageous for avoiding a rejection of a transaction in the second region merely because the transaction is occurring in the second region or because that user neglected to place a foreign travel notice on the portable financial device being used. A target action may also include any other action directed to incentivizing, educating, or encouraging a user in the subset of target users to use their portable financial device in the first region or second region.

Figure 4:
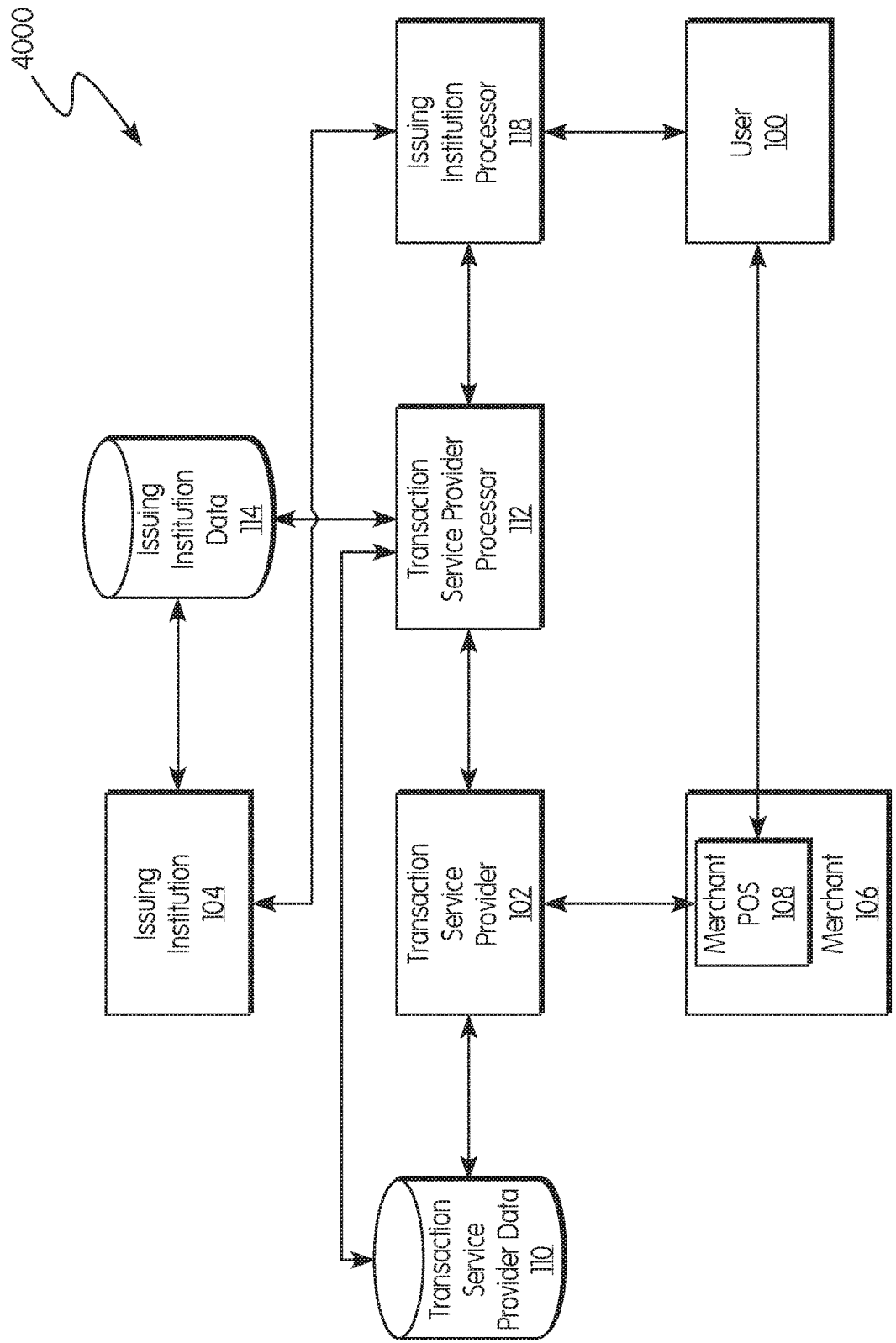
FIG. 4 is another schematic diagram of a system for segmenting a plurality of users in a first region based on predicted activity external to the first region according to some non-limiting embodiments or aspects.

Referring to FIG. 4, a system 4000 for segmenting a plurality of users in a first region based on predicted activity external to the first region is shown according to some non-limiting embodiments or aspects. The components of the system 4000 shown in FIG. 4 include all of the capabilities and characteristics of the components from the system 1000 of FIG. 1 having like reference numbers. In some non-limiting embodiments or aspects of the system 4000 shown in FIG. 4, the transaction service provider processor 112 may be in communication with an issuing institution processor 118. In some non-limiting embodiments or aspects, the issuing institution processor 118 may be a separate computer system from the issuing institution 104 or, in other examples, may be a part of the issuing institution 104. The issuing institution processor 118 may be owned and/or controlled by or on behalf of the issuing institution 104. The issuing institution processor 118 may be located at the issuing institution 104 or elsewhere and may be in communication with the issuing institution 104. The issuing institution processor 118 may be located remotely from the transaction service provider processor 112. In some non-limiting embodiments or aspects of the system 4000 shown in FIG. 4, the issuing institution processor 118 may initiate at least one target action based on a communication from the transaction service provider processor 112 by communicating with the user 100 or some group of target users. For instance, the transaction service provider processor 112 may communicate data, such as a list of target users, to the issuing institution processor 118, which processes that data before taking a further target action, such as transmitting a communication to the user 100. The communication from the issuing institution processor 118 to the user 100 may include a web-based communication, an email communication, a text message, a telephone call, a push notification, and/or an instant message. The issuing institution processor 118 may identify at least one offer for a user and communicate that offer to that user. The communication may also be informational or associated with incentivizing the user 100 to use the portable financial device in connection with travel to the second region. The user 100 may also communicate with the issuing institution processor 118 using like communication methods.

Figure 5:
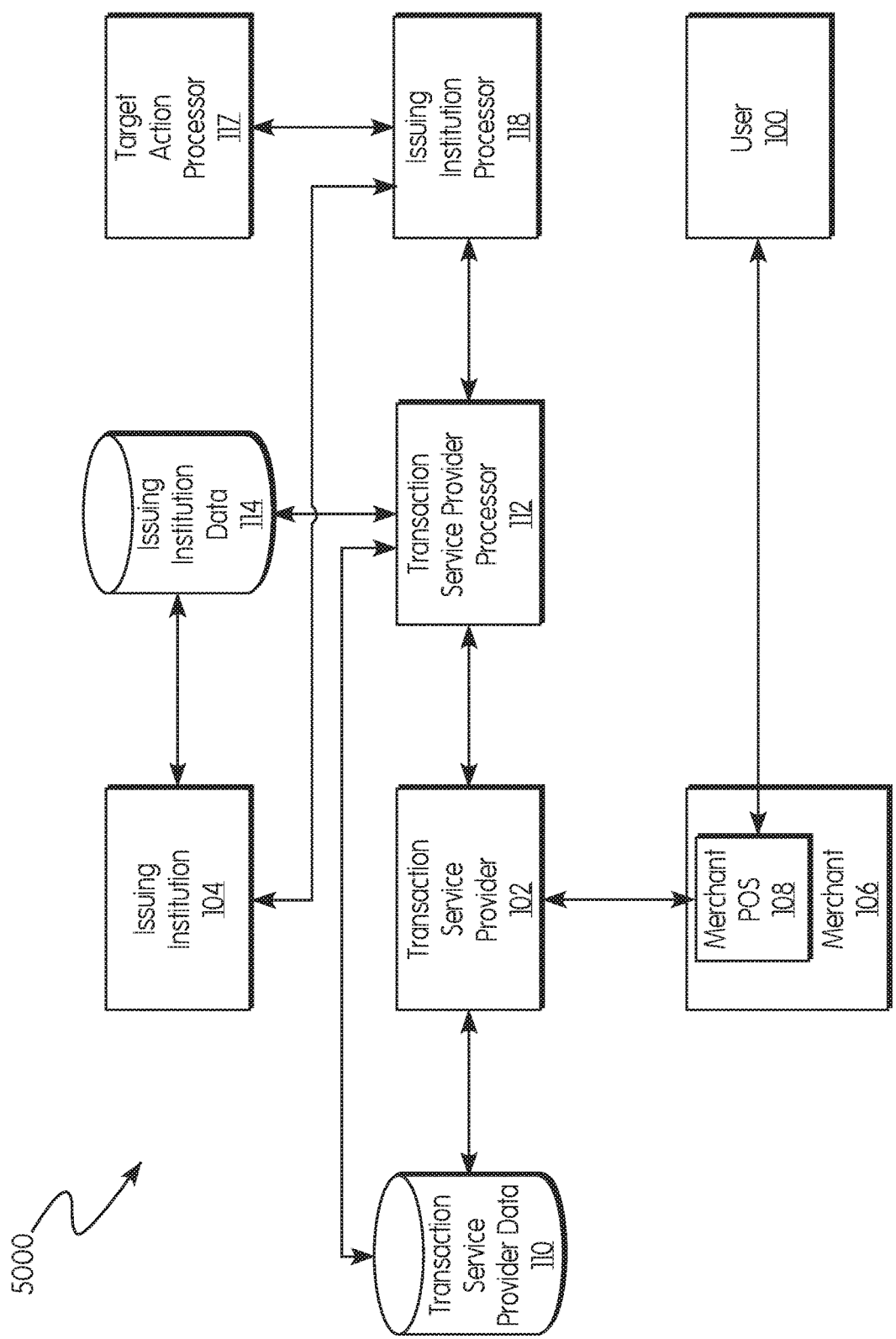
FIG. 5 is another schematic diagram of a system for segmenting a plurality of users in a first region based on predicted activity external to the first region according to some non-limiting embodiments or aspects.

Referring to FIG. 5, a system 5000 for segmenting a plurality of users in a first region based on predicted activity external to the first region is shown according to some non-limiting embodiments or aspects. The components of the system 5000 in FIG. 5 include all of the capabilities and characteristics of the components from the system 3000 of FIG. 3 or system 4000 of FIG. 4 having like reference numbers. In some non-limiting embodiments of the system 5000 shown in FIG. 5, the issuing institution processor 118 may initiate at least one target action based on a communication from the transaction service provider processor 112 by communicating with the issuing institution 104 or the issuing institution database 114. For instance, the transaction service provider processor 112 may communicate data to the issuing institution processor 118, which processes that data. The issuing institution database 114 may be hosted by or on behalf of the issuing institution 104. In some non-limiting embodiments or aspects, the issuing institution processor 118 generates a list of target users associated with the issuing institution 104 and communicates that list of target users to the issuing institution 104 or the issuing institution database 114. The list may be used to, in turn, provide target users with an offer, or for other purposes, such as approving a user for a transaction in the second region or other target action.

With continued reference to FIG. 5, in some non-limiting embodiments the issuing institution processor 118 may initiate a target action by transmitting a signal to a target action processor 117. The target action processor 117 may be a separate computer system or, in other examples, may be a part of the issuing institution processor 118. This target action may include automatically approving a user of a plurality of target users for transactions in the at least one second region. A target action may also include any other action directed to incentivizing, educating, or encouraging a user in the subset of target users to use their portable financial device in the first region or second region.

Figure 6:
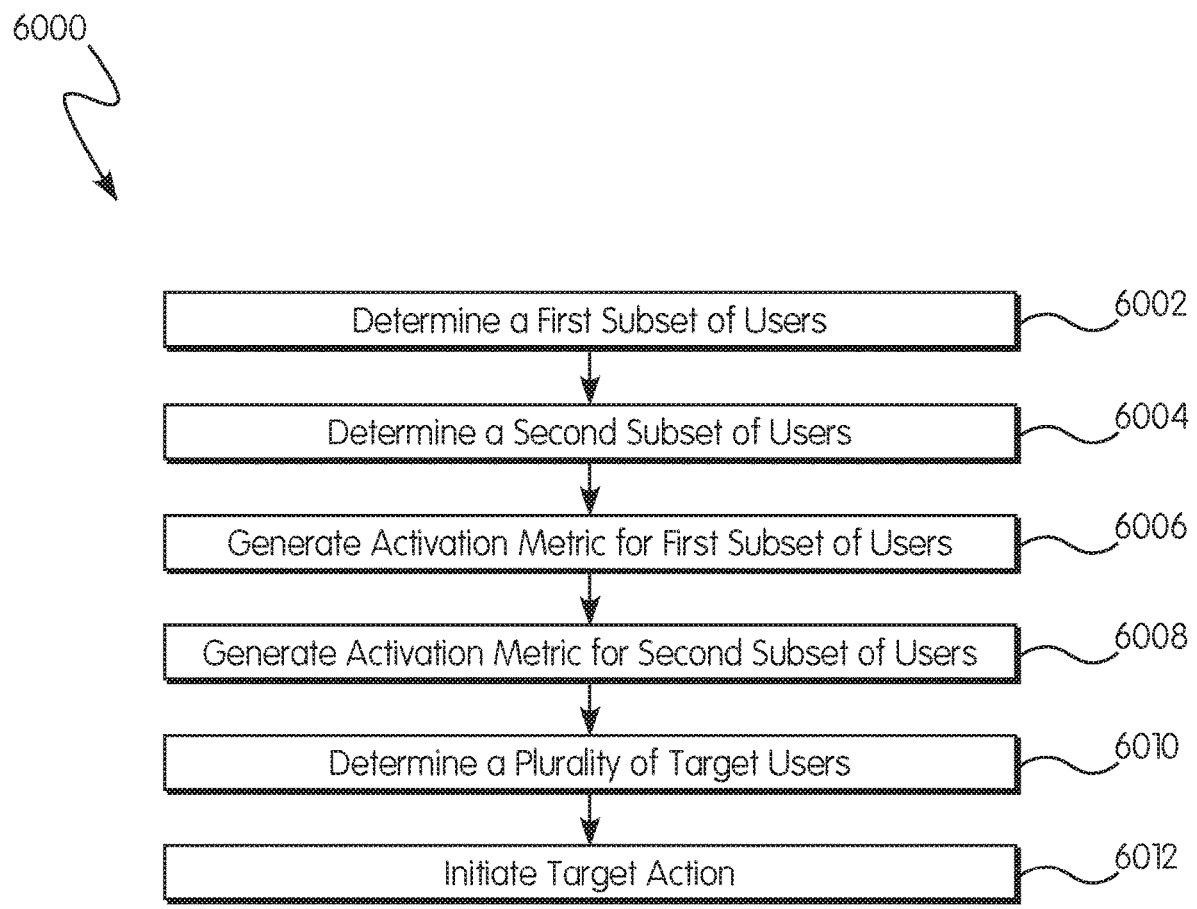
FIG. 6 is step diagram of a method of segmenting a plurality of users in first region based on predicted activity external to the first region according to some non-limiting embodiments or aspects.

Referring to FIG. 6, a method 6000 is shown for segmenting a plurality of users in a first region based on predicted activity external to the first region. With continued reference to FIG. 6, and referring back to FIGS. 1-5, step 6002 may include determining a first subset of users from a plurality of users. The first subset of users may include users that have used their portable financial device in the past in the second region to initiate a transaction. In some non-limiting embodiments or aspects, users in the first subset of users have used their portable financial device to initiate a transaction in the second region at least a predetermined number of times. This predetermined number of times may be a number of times determined by the transaction service provider 102 or the issuing institution 104 such that certain transaction parameters (e.g., a first plurality of transaction parameters) provide a reliable prediction of that user's propensity to use their portable financial device in the second region in the future. For instance, in some non-limiting embodiments or aspects, the first subset of users will include all users who have ever used their portable financial device in the second region (even once). In other non-limiting embodiments, the first subset of users may include all users who have used their portable financial device in the second region at a certain predetermined frequency, such as at least once a month, at least once a quarter, at least once a year, and the like.

With continued reference to FIG. 6, and referring back to FIGS. 1-5, step 6004 may include determining a second subset of users from the plurality of users. The second subset of users may include users that have not used their portable financial device at all or less than a predetermined number of times in the past (e.g. since the origination of the account and/or going back a predetermined number of years) in the second region to initiate a transaction. This predetermined number of times may be a number of times determined by the transaction service provider 102 or the issuing institution 104 such that certain transaction parameters (e.g., a second plurality of transaction parameters) provide a reliable prediction of that user's propensity to use their portable financial device in the second region in the future. This second plurality of transaction parameters may be the same as or different from the first plurality of transaction parameters. The first plurality of transaction parameters and the second plurality of transaction parameters may include parameters from the previously-listed or transaction parameters. In some non-limiting embodiments or aspects, the second subset of users may include all users who have never used their portable financial device in the second region (not even once). In other non-limiting embodiments, the second subset of users may include all users who have used their portable financial device in the second region less than a certain predetermined frequency, such as at least once a month, at least once a quarter, at least once a year, and the like. It will be appreciated that, in some non-limiting embodiments or aspects, the predetermined number of times or frequency for the first subset of users is different than the predetermined number of times or frequency for the second subset of users, such that there may be overlap between the first subset of users and the second subset of users.

Still referring to FIG. 6, and referring back to FIGS. 1-5, step 6006 may include generating an activation metric for the first subset of users. The activation metric may be used to determine the propensity of users in the first subset of users to initiate transaction activity in the second region. The activation metric may be generated by the transaction service provider processor 112 using data from the transaction service provider database 110 and/or other external parameters from a third party database and/or the issuing institution database 114. The transaction service provider processor 112 may use the previously-described categories of transaction data including the transaction parameters to generate the activation metric for the first subset of users. In some non-limiting embodiments or aspects, the transaction service provider processor 112 analyzes some combination of this data (e.g., the first plurality of transaction parameters) and generates the activation metric for each user in the first subset of users.

In some non-limiting embodiments or aspects, there may be an order and/or weight assigned to the transaction parameters. For instance, in some non-limiting embodiments or aspects, the categories of transaction data may be assigned an order and/or weight such as the overall usage of portable financial device category may be ordered ahead of external factors, so as to determine relative order of the transaction parameters of the categories of transaction data. The order of these categories of transaction data may be determined based on their predicted reliability to project user propensity for initiating transaction activity in the at least one second region. In some non-limiting embodiments or aspects, the transaction parameters within each category of transaction category may be assigned an order and/or weight. For instance, in some non-limiting embodiments or aspects, transaction parameters within a category of transaction data may be assigned an order and/or weight such as the frequency or amount of travel service transactions may be ordered ahead of the frequency or amount of lodging transactions for the usage of portable financial device on travel and entertainment category of transaction data. In some non-limiting embodiments or aspects, the transaction parameters across various categories of transaction data may be assigned an order and/or weight relative to one another. It will be appreciated that any order and/or weight may be assigned to the transaction parameters so as to enhance reliability to project user propensity for initiating transaction activity in the at least one second region The activation metric may be generated for each user of the first subset of users based at least in part on a first algorithm, the first plurality of transaction parameters, and transaction data for portable financial device transactions initiated by each user. The first algorithm may correspond to a ranking of the first plurality of transaction parameters based on an order and/or weight of which the first plurality of transaction parameters are expected to be relevant for predicting users in the first subset's propensity for initiating transaction activity in the second region. For example, for a first plurality of transaction parameters including parameter A and parameter B, it may be determined that parameter A is more strongly associated with predicting users in the first subset's propensity for initiating transaction activity in the second region compared to parameter B, and the first algorithm would weigh parameter A accordingly. It will be appreciated that the activation metric may be generated by the transaction service provider processor 112 or any other entity.

Referring to FIG. 6, and referring back to FIGS. 1-5, step 6008 may include generating an activation metric for the second subset of users. The activation metric may be used to determine the propensity of users in the second subset of users to initiate transaction activity in the second region. The activation metric may be generated by the transaction service provider processor 112 using data from the transaction service provider database 110 and/or other external parameters from a third party database and/or the issuing institution database 114. The transaction service provider processor 112 may use the previously-described transaction parameters to generate the activation metric for the second subset of users. In some non-limiting embodiments or aspects, the transaction service provider processor 112 analyzes some combination of this data (e.g., the second plurality of transaction parameters) and generates the activation metric for each user in the second subset of users.

The activation metric may be generated for each user of the second subset of users based at least in part on a second algorithm, the second plurality of transaction parameters, and transaction data for portable financial device transactions initiated by each user. The second algorithm may correspond to a ranking of the second plurality of transaction parameters based on an order or weight of which the second plurality of transaction parameters are expected to be relevant for predicting users in the second subset's propensity for initiating transaction activity in the second region. For example, for a second subset of transaction parameters including parameter A and parameter B, it may be determined that parameter A is more strongly associated with predicting users in the second subset's propensity for initiating transaction activity in the second region compared to parameter B, and the second algorithm would weigh parameter A accordingly. The second algorithm may be different than the first algorithm, and the parameters may differ. It will be appreciated that the activation metric may be generated by the transaction service provider processor 112 or any other entity.

The first algorithm and the second algorithm may comprise a machine learning algorithm configured to apply at least one predictive model to the transaction data for each user. The machine learning algorithm may be any machine-learning algorithm capable of making the predictive model more accurate over time based on prior transaction data. In some non-limiting embodiments or aspects, the machine-learning algorithm includes a machine learning gradient boosted model, such as a TreeNet gradient boosted model. A gradient boosted model includes numerous different decision trees (e.g., n trees) each having a probability score. The scores are added such that $tree_n$ represents the sum of the probability scores of each tree. It will be appreciated that, in other non-limiting embodiments, the machine learning algorithm includes other various advanced statistical methods and tools for modeling users' propensity for engaging in an activity based on prior data.

Referring to FIG. 6, and referring back to FIGS. 1-5, step 6010 may include determining a plurality of target users. The target users may be generated based at least in part on the activation metrics previously described. It will be appreciated that the target users may be generated by the transaction service provider processor 112 or any other entity. The target users may include users that have a higher propensity to initiate transaction activity, such as by using their portable financial device, in the second region. The target users may be ranked relative to one another. In some non-limiting embodiments or aspects, the target users may include a subset of the plurality of users. For instance, the target users may include the top 10% of the plurality of users based in part on the activation metrics, such as the top 15%, top 20%, top 25%, top 30%, top 33%, top 35%, top 40%, top 45%, top 50%, and the like. It will be appreciated that any percentage of the plurality of users may be included in the target users.

In some non-limiting embodiments or aspects, the target users are generated separately from the first subset of users and the second subset of users. For example, there may be a first group of target users from the first subset and a second group of target users from the second subset, where these groups are determined independently from one another such that the final group of target users (e.g., combining the first group of target users and the second group of target users) includes the top 10% of users from each group of target users. In some non-limiting embodiments or aspects, the target users from the first group and the second group are generated together by normalizing the activation metrics such that a direct comparison may be accurately made. For this scenario, it may be true that a user in the first subset that is in the top 10% of the first subset may not be in the top 10% of all of the users while a user in the second subset outside of the top 10% of the second subset is in the top 10% of all users. This may mean that the user in the top 10% of the first group is not a target user, while the user in the second subset of users outside the top 10% of the second subset may be in the target users because the target users are the top 10% of all users.

With continued reference to FIG. 6, and referring back to FIGS. 1-5, step 6012 may include automatically initiating at least one target action for each user of the plurality of target users. The target action may be any of the previously described target actions and may be initiated by any entity including the transactions service provider processor 112, the issuing institution processor 118, or the target action processor 117. The target action may include communicating with the target users, and such communication may include a web-based communication, an email communication, a text message, a telephone call, a push notification, and/or an instant message. The target action may include generating a list of target users associated with an issuing institution. This target action may include automatically approving a user of a plurality of target users for transactions in the at least one second region. The target action may include any other action directed to incentivizing, educating, or encouraging a user in the subset of target users to use their portable financial device in the first region or second region.

Figure 7:
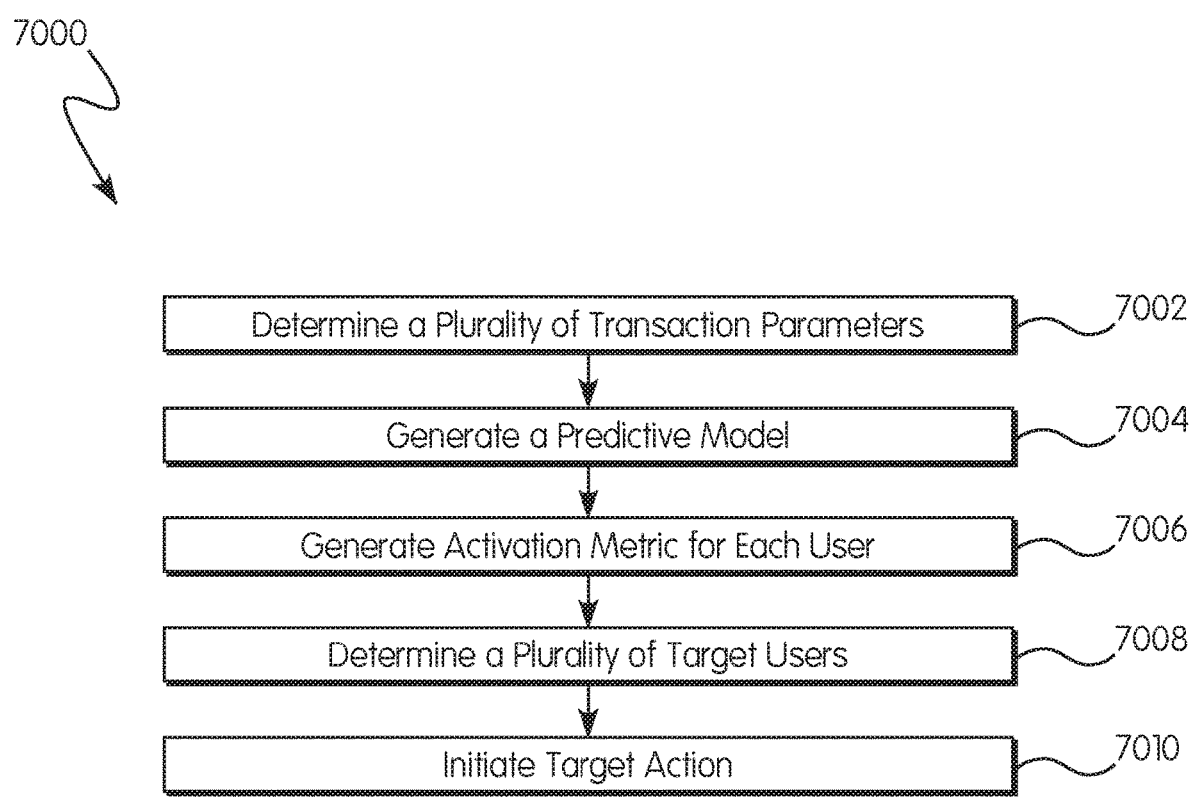
FIG. 7 is another step diagram of a method of segmenting a plurality of users in first region based on predicted activity external to the first region according to some non-limiting embodiments or aspects.

Referring to FIG. 7, a method 7000 of segmenting a plurality of users in a first region based on a predicted activity external to the first region is shown. With continued reference to FIG. 7, and referring back to FIGS. 1-5, step 7002 may include determining a plurality of transaction parameters associated with a propensity to conduct transactions in at least one second region external to the first region at least partially based on prior transaction data. The plurality of transaction parameters may be any of the transaction parameters previously listed. This step may be performed by the transaction service provider processor 112 or any other entity. The prior transaction data may indicate which of the transaction parameters are relevant and should be included in the plurality of transaction parameters associated with a propensity to conduct transactions using a portable financial device in the second region. The plurality of transaction parameters may include any number of the transaction parameters. The plurality of transaction parameters may include only the transaction parameters deemed most relevant, such as the 15 most relevant, the 10 most relevant, the 8 most relevant, the 5 most relevant, and/or the like.

With continued reference to FIG. 7, and referring back to FIGS. 1-5, step 7004 may include generating a predictive model based at least partially on the plurality of transaction parameters and the prior transaction data. The predictive model may be used to determine user propensity to conduct transactions in at least one second region external to the first region. The predictive model may be generated using the previously-determined plurality of transaction parameters associated with a propensity to conduct transactions in the second region. In some non-limiting embodiments or aspects, the transaction service provider processor 112 or other system analyzes prior transaction data for the plurality of transaction parameters and generates the predictive model based, at least in part, on that analyzed prior transaction data. It will be appreciated that the predictive model may be generated by any entity.

More than one predictive model may be generated in step 7004. In some non-limiting embodiments or aspects, the plurality of transaction parameters relevant for the first subset of users may be used to generate a first predictive model. This first predictive model may apply to the first subset of users. In some non-limiting embodiments or aspects, the plurality of transaction parameters relevant for the second subset of users may be used to generate a second predictive model. This second predictive model may apply to the second subset of users.

With continued reference to FIG. 7, and referring back to FIGS. 1-5, step 7006 may include generating an activation metric for each user of the plurality of users, based at least partially on the predictive model and transaction data for portable financial device transactions initiated by the user. Step 7006 may be performed in the same way as steps 6008 and 6010 of FIG. 6 (described in detail above).

With continued reference to FIG. 7, and referring back to FIGS. 1-5, step 7008 may include determining, based at least partially on the activation metrics for each user a plurality of target users from the plurality of users, the plurality of target users having a propensity for conducting transaction in the at least one second region. Step 7008 may be performed in the same way as step 6010 of FIG. 6 (described in detail above).

With continued reference to FIG. 7, and referring back to FIGS. 1-5, step 7010 may include automatically initiating at least one target action for each user of the plurality of target users. Step 7010 may be performed in the same way as step 6012 of FIG. 6 (described in detail above).

In some non-limiting embodiments or aspects, a computer program product for segmenting a plurality of users in the first region based on predicted activity external to the first region includes at least one non-transitory computer readable medium including program instructions that, when executed by at least one processor, cause the at least one processor to execute one of the previously-described methods (e.g., method 6000 or method 7000). The at least one processor may include the transaction service provider processor 112, the issuing institution processor 118, and/or the target action processor 117.

The computer program product may include a plurality of computer-readable media, such as a first computer-readable medium and a second computer-readable medium. The first computer-readable medium may be located at a transaction service provider 102. The second computer-readable medium may be located remotely from the transaction service provider 102, such as at the issuing institution 104. It will be appreciated that the computer program product may be distributed in any number of ways.

EXAMPLES

Figure 8:
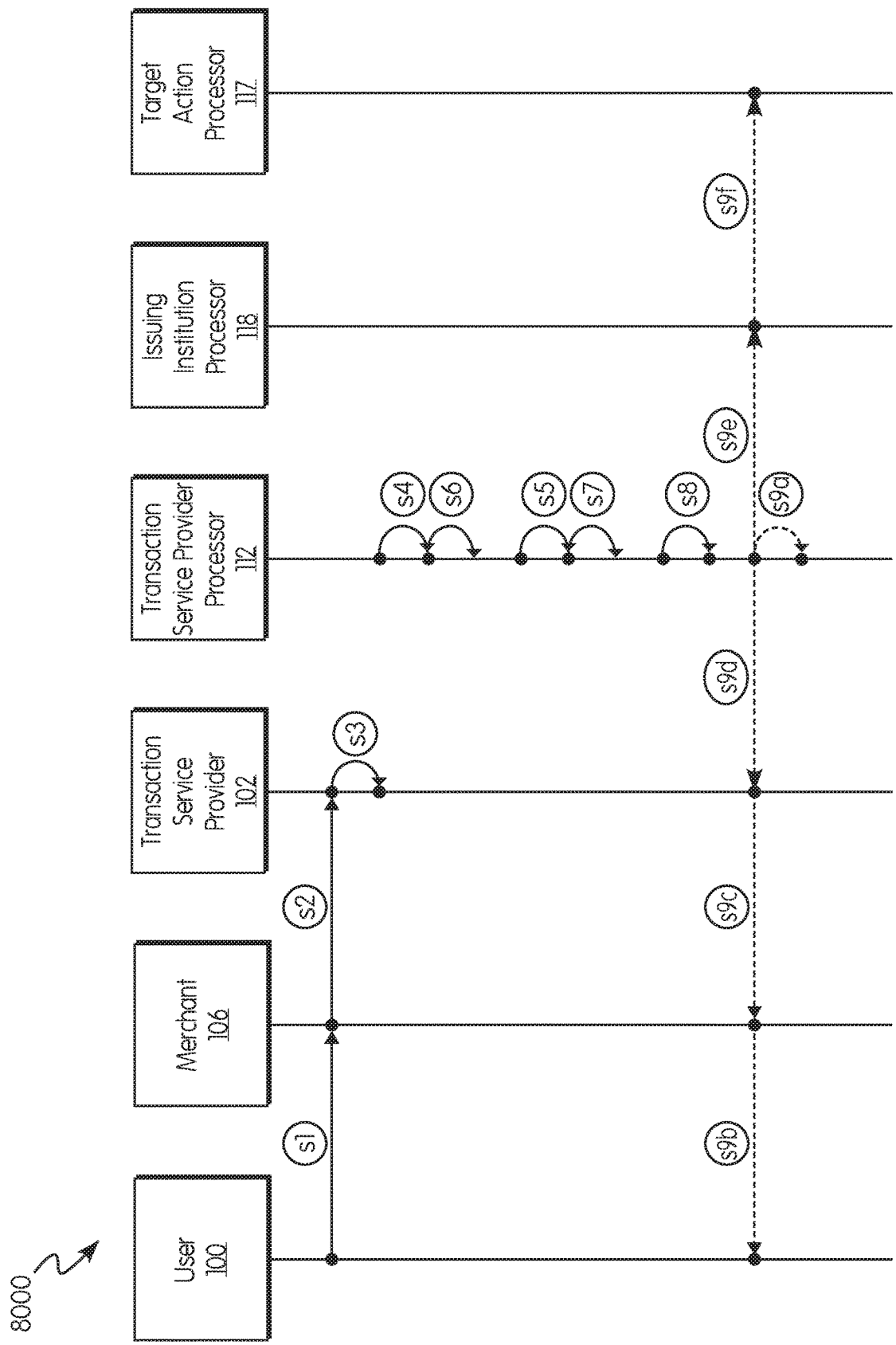
FIG. 8 is a process flow diagram for segmenting a plurality of users in a first region based on predicted activity external to the first region according to some non-limiting embodiments or aspects.

Referring to FIG. 8, a process flow diagram shows an exemplary process 8000 for segmenting a plurality of users in a first region based on predicted activity external to the first region. It will be appreciated that the steps shown in the process flow diagram are for exemplary purposes only, and that in various non-limiting embodiments additional or fewer steps maybe performed to segment users. At a first step (s1), a user 100 initiates and completes a financial transaction using a portable financial device associated with the transaction service provider 102 issued by the issuing institution 104. For example, the transaction may be a withdrawal from an ATM or it may be a financial transaction with a merchant 106 having a merchant POS 108. In the case of a financial transaction with a merchant 106 having a merchant POS 108 (shown in FIG. 8), the user 100 provides information from his/her portable financial device, such as an account identifier (e.g., 16-digit PAN), to complete a financial transaction in exchange for goods or services offered by the merchant 106. The merchant POS 108, in response, processes the transaction. At a second step (s2), the merchant 106, through the merchant POS 108, communicates transaction data concerning the financial transaction between the merchant 106 and the user 100 to the transaction service provider 102. In some non-limiting embodiments or aspects, the merchant POS 108 communicates the information to a processor of the transaction service provider 102 or the transaction service provider processor 112. Information sent to the transaction service provider 102 may include date and time of the transaction, location of the transaction, amount of the transaction, type of goods or services purchased, and/or the like. The processor of the transaction service provider 102 may, in some cases, be the same processor as the transaction service provider processor 112, or it may be a separate processor associated with the transaction service provider 102. If the transaction by the user 100 is an ATM transaction (e.g., withdrawal), the information regarding the withdrawal may be sent to the transaction service provider 102. Information in this situation may include, for example, date and time of transaction, amount of withdrawal, location of withdrawal, and/or other like transaction data. At a third step (s3), the transaction service provider 102 relays the information collected regarding the user's transactions to a transaction service provider database 110 owned and/or controlled by or on behalf of the transaction service provider 102. The first through third steps of FIG. 8 (s1-s3) may be performed for any number of transactions for a particular user 100 and may be performed for all transactions by any number of users who are account holders of accounts provided or managed by the transaction service provider 102.

With continued reference to FIG. 8, at a fourth step (s4), the transaction service provider processor 112 determines a first subset of users from the plurality of users, where the first subset of users includes users having previously used a portable financial device in at least one second region to initiate a transaction in the at least one second region at least a predetermined number of times. For instance, the first subset may include all users who have made at least one cross-border (e.g., in the second region) transaction using a portable financial device, such as a citizen of the United States making a purchase in Canada using a credit card.

With continued reference to FIG. 8, at a fifth step (s5), the transaction service provider processor 112 determines a second subset of users from the plurality of users, where the second subset of users includes users having previously used a portable financial device in at least one second region to initiate a transaction in the at least one second region less than a predetermined number of times. For instance, the second subset may include all users who have never made a cross-border (e.g., in the second region) transaction using a portable financial device.

With continued reference to FIG. 8, at a sixth step (s6), the transaction service provider processor generates an activation metric for each user of the first subset of users based at least partially on a first algorithm, a first plurality of transaction parameters, and transaction data for portable financial device transactions initiated by each user. The first algorithm may correspond to a ranking of the first plurality of transaction parameters based on an order and/or weight for which the first plurality of transaction parameters are expected to be relevant for predicting users in the first subset's propensity for initiating transaction activity in the second region. The first plurality of transaction parameters for the first subset of users may include, for instance, the transaction parameters deemed relevant for determining user propensity for initiating transaction activity in the second region. In some non-limiting embodiments or aspects, the transaction parameters deemed relevant may include any of the previously listed transaction parameters. The activation metric may be generated for each user in the first subset by considering the first algorithm, the relevant transaction parameters, and the transaction data for each user to generate an activation metric for each user in the first subset.

With continued reference to FIG. 8, at a seventh step (s7), the transaction service provider processor 112 generates an activation metric for each user of the second subset of users based at least partially on a second algorithm, a second plurality of transaction parameters, and transaction data for portable financial device transactions initiated by each user. The second algorithm may correspond to a ranking of the second plurality of transaction parameters based on an order and/or weight for which the second plurality of transaction parameters are expected to be relevant for predicting users in the second subset's propensity for initiating transaction activity in the second region. The second plurality of transaction parameters for the second subset of users may include, for instance, the transaction parameters deemed relevant for determining user propensity for initiating transaction activity in the second region for the second subset of users. In some non-limiting embodiments or aspects, the transaction parameters deemed relevant include any of the previously listed transaction parameters. The activation metric may be generated for each user in the second subset by considering the second algorithm, the relevant transaction parameters, and the transaction data for each user to generate an activation metric for each user in the second subset.

With continued reference to FIG. 8, at an eighth step (s8), the transaction service provider processor 112 (or other entity such as the issuing institution processor 118 or the target action processor 117) determines a plurality of target users from the plurality of target users. In some non-limiting embodiments or aspects, the first subset and the second subset are combined after the activation metric is applied to yield the target users, and the plurality of target users may include the top 30% of all users. In other embodiments, the first subset and the second subset are separately considered, and the top 30% of users from the first subset and the top 30% of users from the second subset may constitute the plurality of target users. These target users are determined to have a propensity for initiating transaction activity in the at least one second region.

With continued reference to FIG. 8, at a ninth step (s9a-s9f), the transaction service provider processor 112 (or other entity such as the issuing institution processor 118 or the target action processor 117) automatically initiates a target action for each of the plurality of target users. In some non-limiting embodiments or aspects, the transaction service provider processor 112 generates a list of the plurality of target users who are considered to have the highest propensity for initiating transaction activity in the at least one second region relative to the other users. The transaction service provider processor 112 may then initiate the target action (s9a), such as by automatically approving a transaction in the second region for the plurality of target users. The transaction service provider processor 112 may communicate offers and/or information to the users on the list of target users, as the target action (s9b). The transaction service provider processor 112 may generate and transmit a list of target users to at least one merchant so that the merchant may provide the target users with an offer, as the target action (s9c). The transaction service provider processor 112 may transmit the list to the transaction service provider 102 so that the transaction service provider 102 may provide the target users with an offer as the target action (s9d). The transaction service provider processor 112 may transmit the list to the issuing institution processor 118 to initiate the target action (s9e). The transaction service provider processor 112 may also transmit the list to the target action processor 117 to initiate the target action (s9f).

In some non-limiting embodiments or aspects, the conversion action may include any of the target actions previously described. The target action may include communicating with the target users, and such communication may include a web-based communication, an email communication, a text message, a telephone call, a push notification, and/or an instant message. The target action may also include generating a list of target users associated with the issuing institution 104, and/or automatically approving a user of a plurality of target users for transactions in the at least one second region. The target action may include any other action directed to incentivizing, educating, or encouraging a user in the subset of target users to use their portable financial device in the first region or second region Referring to FIG. 9, a process flow diagram shows an exemplary process 8000 for segmenting a plurality of users in a first region based on predicted activity external to the first region. The first step through the seventh step (s1-s7) may be identical to the exemplary process 8000 described above and illustrated in FIG. 8. Following the seventh step in the exemplary process 9000 of FIG. 9, a tenth step (s10) may be performed. At the tenth step (s10), the transaction service provider processor 112 determines a plurality of target users from the plurality of target users, as described in the eighth step (s8) described in the process 8000. A listing of the plurality of target users who are considered to have the highest propensity for initiating transaction activity in the at least one second region relative to the other users are transmitted by the transaction service provider processor 112 to the issuing institution processor 118 as part of this tenth step (s10).

Figure 9:
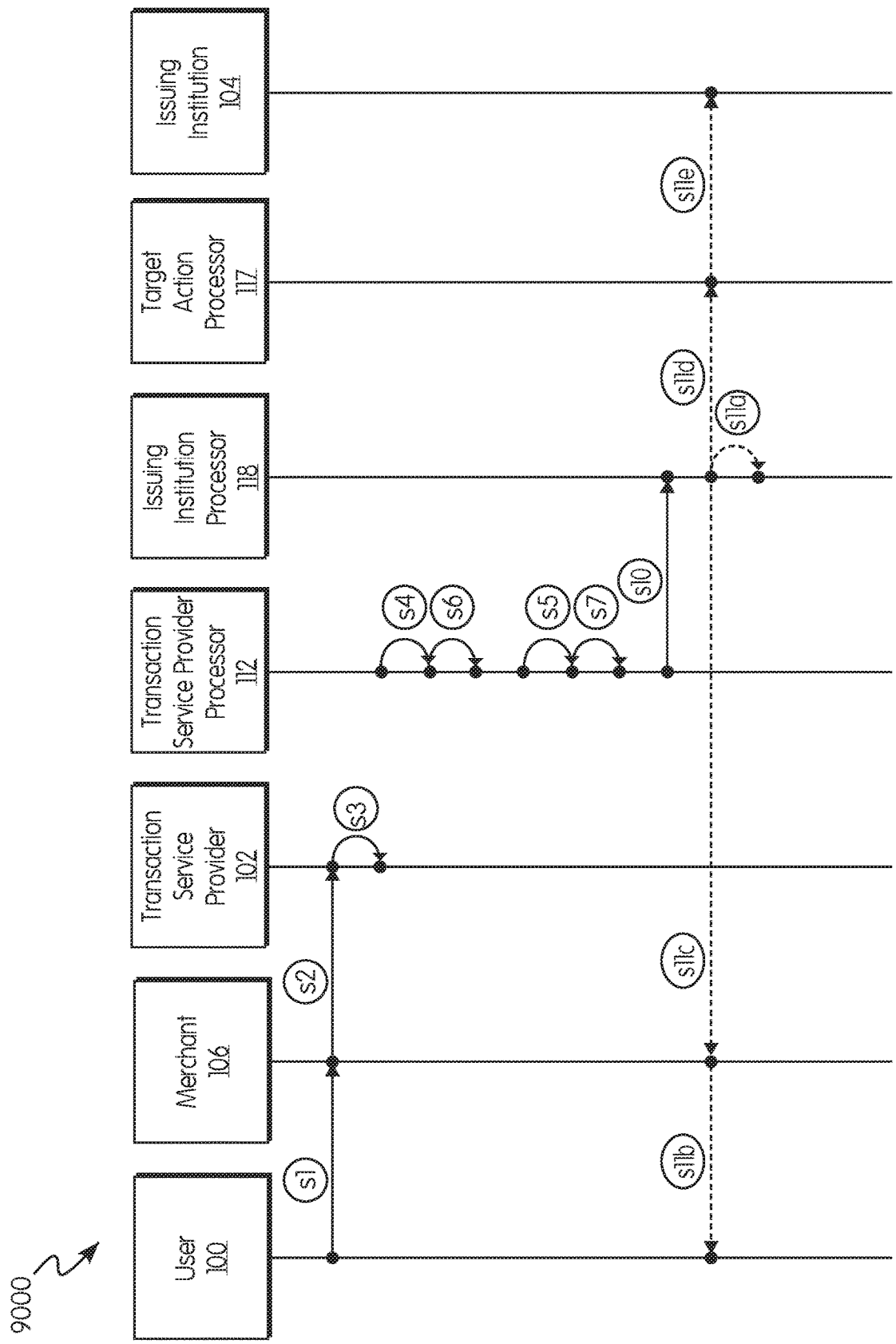
FIG. 9 is another process flow diagram for segmenting a plurality of users in a first region based on predicted activity external to the first region according to some non-limiting embodiments or aspects.

With continued reference to FIG. 9, at an eleventh step (s11a-s11e), the issuing institution processor 118 (or other entity such as the target action processor 117) automatically initiates a target action for each of the plurality of target users. In some non-limiting embodiments or aspects, the issuing institution processor 118 takes the list of the plurality of target users who are considered to have the highest propensity for initiating transaction activity in the at least one second region relative to the other users and initiates the target action (s11a), such as by automatically approving a transaction in the second region for the plurality of target users. The issuing institution processor 118 may communicate an offer or information to the users on the list of target users, as the target action (s11b). The issuing institution processor 118 may transmit the list to at least one merchant so the merchant 106 may provide the target users with an offer, as the target action (s11c). The issuing institution processor 118 may transmit the list to the target action processor 117 to initiate the target action (s11d). The issuing institution processor 118 may transmit the list to the issuing institution 104 so that the issuing institution 104 may provide the target users with an offer as the target action (s11e).

The examples described above allow issuing institutions and/or transaction service providers to determine each user's propensity to make purchases at foreign merchants (e.g. in a second region) using their portable financial device(s). Being able to determine travel propensity allows the issuing institutions and transaction service providers to be able to avoid false fraud alerts from a user's foreign transactions and to offer users timely travel benefits and/or incentives. This enhanced benefit may be seen in FIGS. 10A-11B.

Figure 10A:
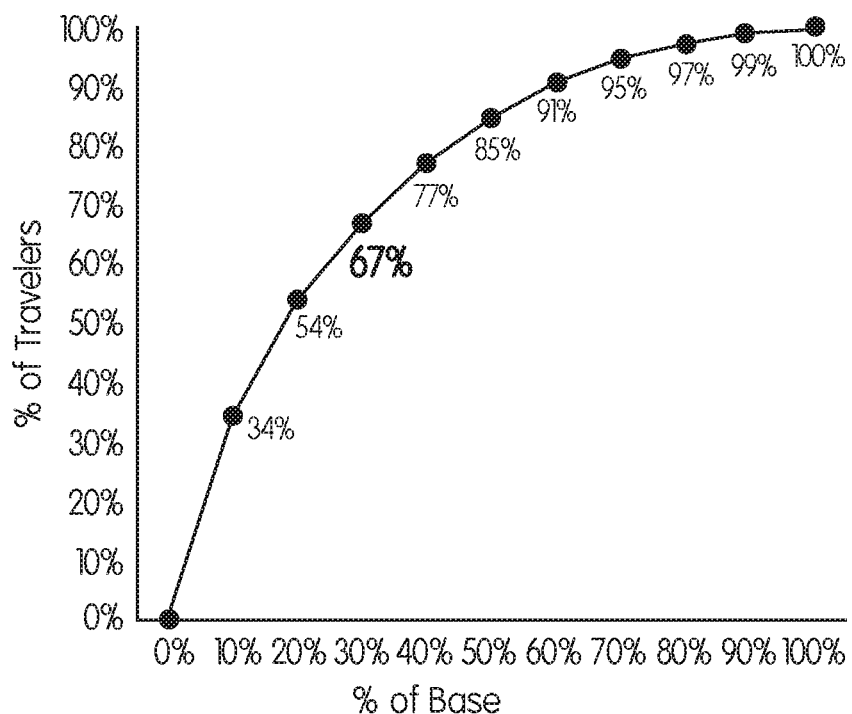
FIG. 10A is a gain plot showing a percentage of cardholders who made a cross-border transaction in a three month period captured as a function of the percentage of all cardholders based on an activation model according to some non-limiting embodiments or aspects.
Figure 10B:
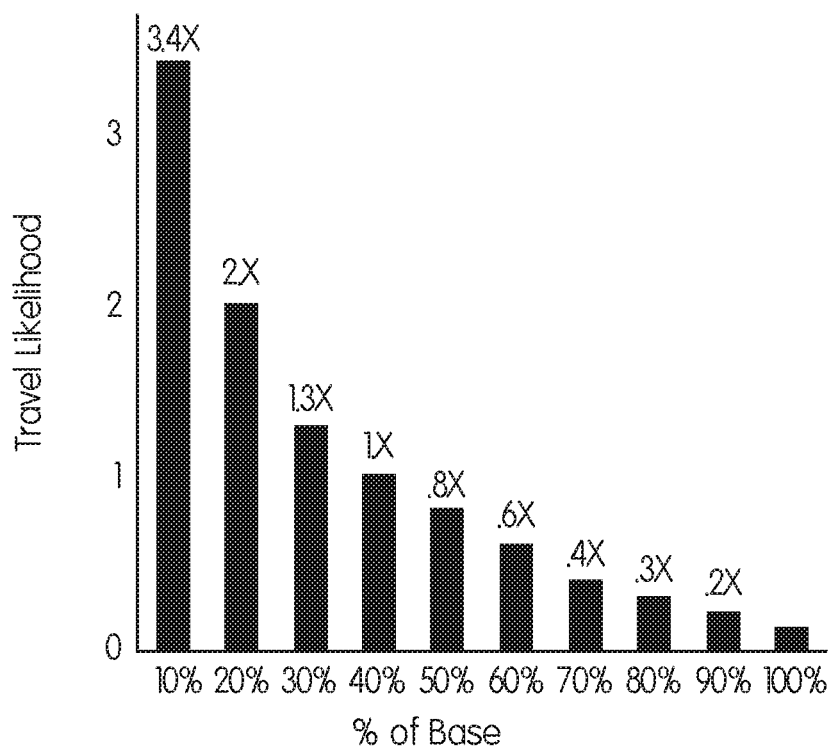
FIG. 10B is a bar graph showing travel likelihood of groups of cardholders in a three month period based on an activation model according to some non-limiting embodiments or aspects.

FIGS. 10A-10B illustrate test data showing how performing the previously-described processes in an activation model leads to more efficient target actions by the transaction service provider 102 and/or the issuing institution 104. An activation model corresponds to a case in which the subset of users have not previously used their portable financial device to initiate a transaction in the at least one second region or have used a portable financial device in the at least one second region less than a predetermined number of times (e.g., the second subset). FIG. 10A shows a gain plot of the percentage of cardholders in the second subset who made a cross-border transaction in a three month period captured as a function of the percentage of all cardholders. From the gain plot in FIG. 10A, it can be seen, for example, that 67% of cardholders in the second subset who made transactions in the second region were captured in the top 30% of all the users. Thus, the transaction service provider 102 or issuing institution 104 can more reliably predict and more efficiently target users that may initiate transactions in the second region in the future. FIG. 10B is a bar graph showing travel likelihood of groups of cardholders in the second subset during a three month period. As can be seen from this graph, high propensity cardholders in the second subset (e.g., cardholders in the top 10% of all cardholders) were 3.4 times more likely to initiate transactions in the second region in the future.

Figure 11A:
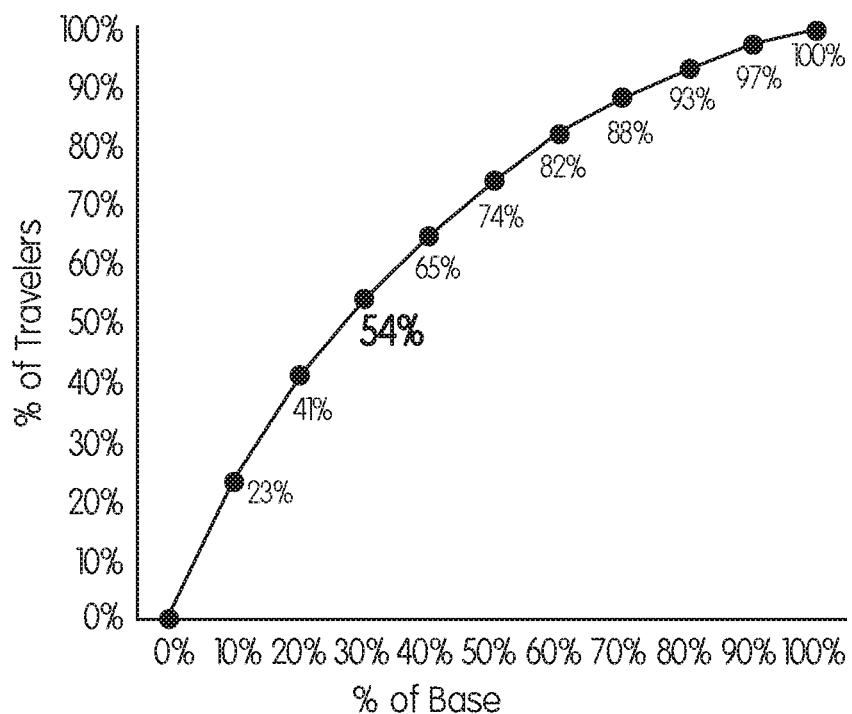
FIG. 11A is a gain plot showing a percentage of cardholders who made a cross-border transaction in a three month period captured as a function of the percentage of all cardholders based on a usage model according to some non-limiting embodiments or aspects.
Figure 11B:
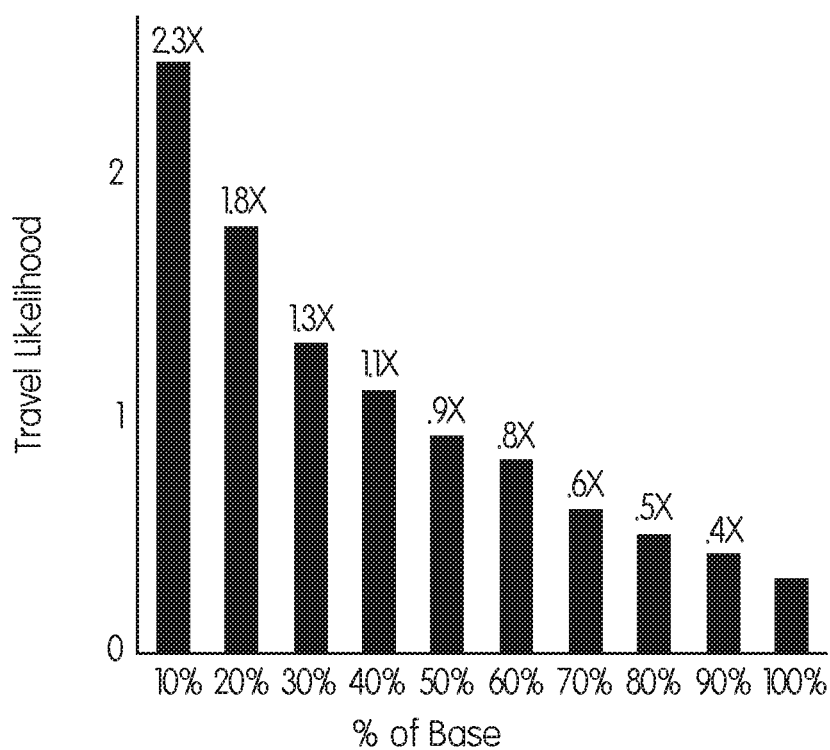
FIG. 11B is a bar graph showing travel likelihood of groups of cardholders in a three month period based on a usage model according to some non-limiting embodiments or aspects.

FIGS. 11A-11B illustrate test data showing how performing the previously-described process in a usage model leads to more efficient target actions by the transaction service provider 102 and/or the issuing institution 104. A usage model corresponds to a case in which the subset of users have previously used their portable financial device in at least one second region to initiate a transaction at least a predetermined number of times (e.g., the first subset). FIG. 11A shows a gain plot of the percentage of cardholders in the first subset who made a cross-border transaction in a three month period captured as a function of the percentage of all cardholders. From the gain plot in FIG. 11A, it can be seen, for example, that 54% of cardholders in the first subset who made transactions in the second region were captured in the top 30% of all the users. Thus, the transaction service provider 102 or issuing institution 104 can more reliably predict and more efficiently target users that may initiate transactions in the second region in the future. FIG. 11B is a bar graph showing travel likelihood of groups of cardholders in the first subset during a three month period. As can be seen from this figure, high propensity cardholders in the first subset (e.g., cardholders in the top 10% of all cardholders) were 2.3 times more likely to initiate transactions in the second region in the future.

In some non-limiting embodiments or aspects, users' propensity to utilize a particular transaction mechanism may be determined. As an example, in addition or alternative to determining the users' propensity to engage in activity external to a first region, users' propensity to utilize an ecommerce checkout mechanism (e.g., Visa Checkout or other systems to conduct an online transaction) to complete an online transaction may be determined. In this manner, users having a higher likelihood of using the particular transaction mechanism in the future can be targeted with offers and/or other actions. An ecommerce checkout mechanism may be a process, application, or device for completing an ecommerce transaction. As an example, an ecommerce checkout mechanism may process user credentials, such as a user name, password, biometric input, and/or the like, and facilitate an ecommerce transaction without requiring a user to fill forms, manually input data, rely on potentially insecure autocomplete solutions, and/or take other actions.

Figure 12:
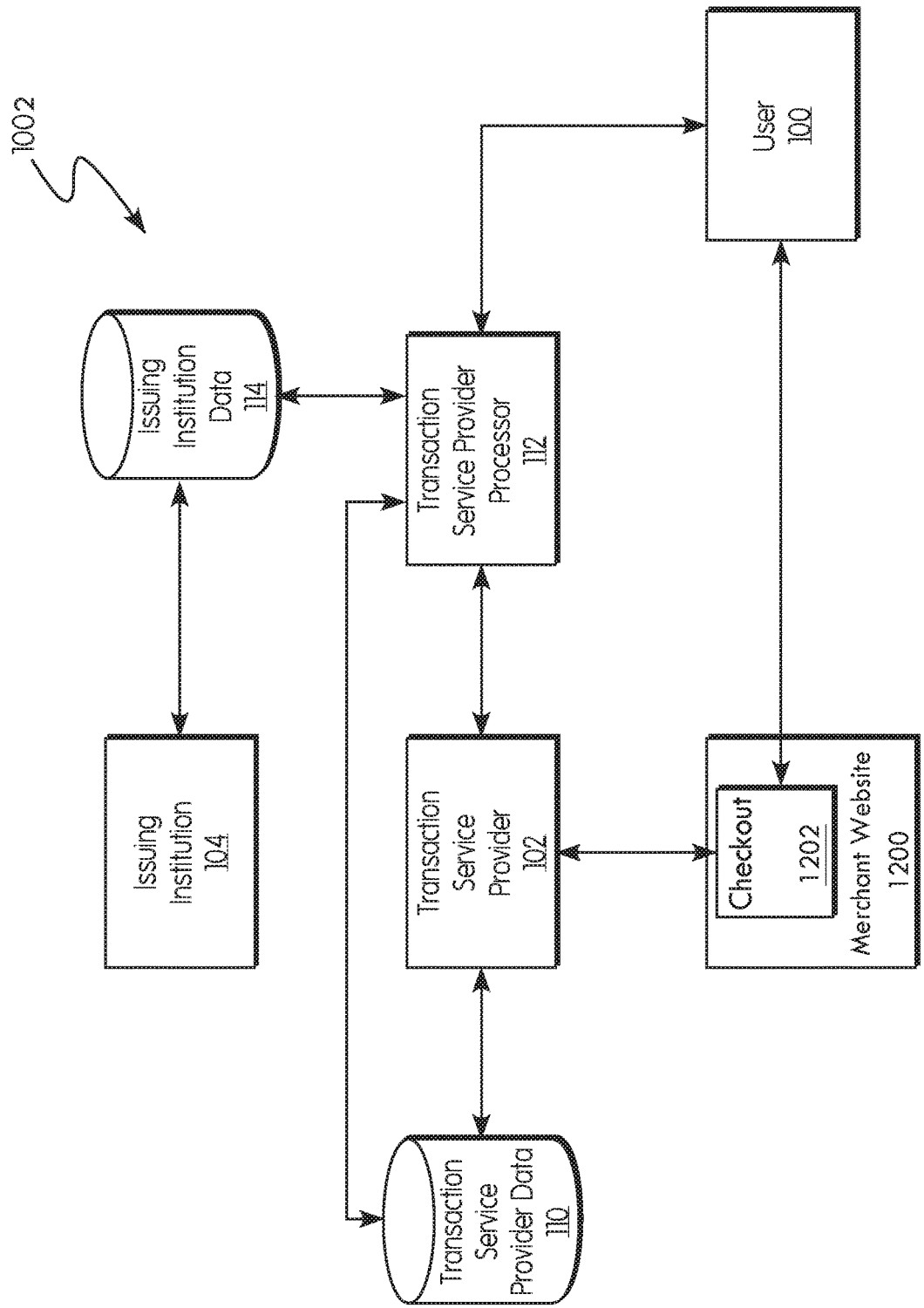
FIG. 12 is a schematic diagram of a system of segmenting a plurality of users based on predicted usage of a transaction mechanism according to some non-limiting embodiments or aspects.

Referring now to FIG. 12, a system 1002 for segmenting a plurality of users based on predicted usage of a transaction mechanism is shown according to some non-limiting embodiments or aspects. A user 100 may be a holder of a portable financial device (e.g., an account holder) associated with a transaction service provider 102 and issued to the user 100 by an issuing institution 104. In some non-limiting embodiments or aspects, the user 100 is a holder of a portable financial device issued by an issuing institution 104 that is associated with an account identifier. The user 100 may use the account identifier to initiate ecommerce transactions with various online merchants 1200 using a merchant checkout system 1202, such as a payment gateway, which communicates with the transaction service provider 102 to complete payment of the financial transactions.

With continued reference to FIG. 12, in some non-limiting embodiments or aspects, the user 100 may purchase goods or services from the merchant website 1200 or a mobile application by inputting a PAN and/or other portable financial device data. A merchant checkout system 1202 of a merchant website 1200 may include an ecommerce checkout mechanism that accepts user credentials, such as a user name, password, biometric input, or the like, and facilitates an ecommerce transaction. The ecommerce checkout mechanism may be embedded in the merchant checkout system 1202 using an Application Programming Interface (API), although various arrangements are possible. For example, a user may input credentials that are communicated from the merchant checkout system 1202 to the transaction service provider 102 and/or transaction service provider processor 112 to determine which account identifier(s) are associated with the credentials. In some examples, the transaction service provider 102 and/or transaction service provider processor 112 may communicate one or more options to the merchant checkout system 1202, such as one or more selectable options for a user, through the merchant website 1200 or merchant checkout system 1202, to choose one or more accounts and/or account identifiers to use for the ecommerce transaction. In other embodiments, the transaction service provider 102 and/or transaction service provider processor 112 may automatically select an account identifier to user for the ecommerce transaction.

Still referring to FIG. 12, a transaction service provider database 110 may include data associated with the following transaction parameters corresponding to a user: (1) user ecommerce transactions in merchant and/or spending categories in which the particular transaction mechanism is available, (2) overall user engagement in ecommerce transactions, (3) overall user engagement in transactions generally, and (4) increased frequency or volume in electronic transactions (e.g., using a physical portable financial device such as a mobile device). In some examples, the transaction parameters may be provided with different weights based on the relative importance of those parameters. In some non-limiting embodiments or aspects, (1) user ecommerce transactions in merchant and/or spending categories in which the particular transaction mechanism is available may have a high relative weight, (2) overall user engagement in ecommerce transactions and (3) overall user engagement in transactions generally may both have a medium relative weight, and (4) increased frequency or volume in electronic transactions may have a low relative weight. Using a gradient boosted model, numerous distinct trees may be generated based on the combination of transaction parameters that may be used to score a user. The scores of each distinct tree are summed to provide a single user score.

In non-limiting embodiments, after their individual propensities are determined, the users may be segmented into one or more groups. For example, users may be segmented into a "low propensity" group, a "medium propensity" group, and a "high propensity" group. It will be appreciated that, in some examples, users may be segmented into a "high propensity" group but there be no other groupings, just a remaining segment of ungrouped users. Target actions may be then directed to just users with a "high propensity" for utilizing a particular transaction mechanism. A "high propensity" user having a score in a top percentile, such as top 5%, 10%, 15%, 20%, 25%, 30%, 33%, 50% and/or the like.

The system and method for segmenting a plurality of users based on predicted usage of a transaction mechanism was validated based on test data. In a first country it was determined that 77% of users to adopt usage of an ecommerce checkout mechanism could be captured in the top 30% of scoring users. In a second country, it was determined that 71% of users to adopt usage of an ecommerce checkout mechanism could be captured in the top 30% of scoring users. Stated another way, in the first country and second country respectively, the top 10% of users were determined to be 4.6 times and 4.5 times more likely to adopt usage of an ecommerce checkout mechanism, the top 20% of users were determined to be 2 times and 1.8 times more likely to adopt usage of an ecommerce checkout mechanism, the top 30% of users were determined to be 1.1 times and 1.1 times more likely to adopt usage of an ecommerce checkout mechanism, the top 40% of users were determined to be 0.7 times and 1.0 times more likely to adopt usage of an ecommerce checkout mechanism, the top 50% of users were determined to be 0.6 times and 0.6 times more likely to adopt usage of an ecommerce checkout mechanism, the top 60% of users were determined to be 0.4 times and 0.5 times more likely to adopt usage of an ecommerce checkout mechanism, the top 70% of users were determined to be 0.3 times and 0.3 times more likely to adopt usage of an ecommerce checkout mechanism, the top 80% of users were determined to be 0.2 times and 0.3 times more likely to adopt usage of an ecommerce checkout mechanism, and the top 90% of users were determined to be 0.1 times and 0.3 times more likely to adopt usage of an ecommerce checkout mechanism.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment may be combined with one or more features of any other embodiment.

The invention claimed is:

1. A method of segmenting a plurality of users in a first region comprising at least one country in which the plurality of users reside, the segmenting based on predicted activity external to the first region, the method comprising:

determining, with at least one processor, a first subset of users consisting essentially of a first plurality of users from the plurality of users that have previously used a portable device in at least one second region to initiate a transaction at least a predetermined number of times, wherein the at least one second region is external to the first region;

determining, with at least one processor, a second subset of users consisting essentially of a second plurality of users from the plurality of users that have not previously used a portable device to initiate a transaction in the at least one second region or have used a portable device to initiate a transaction in the at least one second region less than the predetermined number of times;

generating, with at least one processor, a first activation metric for each user of the first subset of users by applying a first algorithm to transaction data from portable financial device transactions initiated by each user of the first subset of users, the first algorithm based on a first plurality of transaction parameters, each transaction parameter of the first plurality of transaction parameters having an associated weight, wherein the first activation metric represents a determined propensity of a user from the first subset of users to initiate future transaction activity in the at least one second region;

generating, with at least one processor, a second activation metric for each user of the second subset of users by applying a second algorithm different from the first algorithm to transaction data from portable financial device transactions initiated by each user of the second subset of users, the second algorithm based on a second plurality of transaction parameters, each transaction parameter of the second plurality of transaction parameters having an associated weight, wherein the second activation metric represents a determined propensity of a user from the second subset of users to initiate future transaction activity in the at least one second region, wherein the second algorithm is not applied to the portable financial device transactions initiated by each user of the first subset of users;

determining, with at least one processor, a plurality of target users from the first subset of users and the second subset of users based at least partially on the first and second activation metrics, the plurality of target users having a determined higher propensity for initiating future transaction activity in the at least one second region compared to non-target users from the first subset of users and the second subset of users; and in response to determining the plurality of target users, automatically initiating, with at least one processor, at least one target action for each user of the plurality of target users, wherein the first plurality of transaction parameters and the second plurality of transaction parameters comprise at least one of: a frequency of transactions, a transaction spend, a consistency of usage, a frequency or amount of electronic commerce transactions, a frequency or amount of airline transactions, a frequency or amount of travel service transactions, a frequency or amount of lodging transactions, a frequency or amount of retail transactions, a frequency or amount of restaurant transactions, a frequency or amount of general retail transactions, a frequency or amount of apparel retail transactions, a frequency of transactions in the at least one second region, a transaction spend in the at least one second region, a consistency of transactions in the at least one second region, past travel behavior, merchant preferences, amount or frequency of seasonal purchases, number of channels though which user has initiated a transaction, spend behavior, or any combination thereof, wherein the associated weight of each transaction parameter of the first and second plurality of transaction parameters is based on a predicted reliability of the transaction parameter to determine the propensity of a user from the first and/or second subset of users to initiate future transaction activity in the at least one second region.

2. The method of claim 1, wherein at least one of the first algorithm and the second algorithm comprises a machine learning algorithm configured to apply at least one predictive model to the transaction data for at least one of each user of the first subset of users and each user of the second subset of users.

3. The method of claim 1, wherein the at least one target action comprises:
identifying at least one offer for each user of the plurality of target users; and
communicating the at least one offer to each user of the plurality of target users.

4. The method of claim 1, wherein the at least one target action comprises approving a user of the plurality of target users for transactions in the at least one second region.

5. The method of claim 1, wherein the at least one target action comprises:
generating at least one list of at least a portion of the plurality of target users associated with a first issuing institution; and
communicating the at least one list to the first issuing institution.

6. The method of claim 1, wherein the at least one second region comprises all countries external to the first region.

7. The method of claim 1, wherein at least one of the first plurality of transaction parameters and the second plurality of transaction parameters comprises at least one external parameter, the at least one external parameter comprising at least one of the following: a change in currency exchange, a holiday or event schedule in at least one of the first region and the at least one second region, a time of year, or any combination thereof.

8. A system for segmenting a plurality of users in a first region comprising at least one country in which the plurality of users reside, the segmenting based on predicted activity external to the first region, the system comprising at least one server computer including at least one processor, the at least one server computer programmed or configured to:
determine a first subset of users consisting essentially of a first plurality of users from the plurality of users that have previously used a portable device in at least one second region to initiate a transaction at least a predetermined number of times, wherein the at least one second region is external to the first region;
determine a second subset of users consisting essentially of a second plurality of users from the plurality of users that have not previously used a portable device to initiate a transaction in the at least one second region or have used a portable device to initiate a transaction in the at least one second region less than the predetermined number of times;
generate a first activation metric for each user of the first subset of users by applying a first algorithm to transaction data from portable financial device transactions initiated by each user of the first subset of users, the first algorithm based on a first plurality of transaction parameters, each transaction parameter of the first plurality of transaction parameters having an associated weight, wherein the first activation metric represents a determined propensity of a user from the first subset of users to initiate future transaction activity in the at least one second region;
generate a second activation metric for each user of the second subset of users by applying a second algorithm different from the first algorithm to transaction data from portable financial device transactions initiated by each user of the second subset of users, the second algorithm based on a second plurality of transaction parameters, each transaction parameter of the second plurality of transaction parameters having an associated weight, wherein the second activation metric represents a determined propensity of a user from the second subset of users to initiate future transaction activity in the at least one second region, wherein the second algorithm is not applied to the portable financial device transactions initiated by each user of the first subset of users;
determine a plurality of target users from the first subset of users and the second subset of users based at least partially on the first and second activation metrics, the plurality of target users having a determined higher propensity for initiating future transaction activity in the at least one second region compared to non-target users from the first subset of users and the second subset of users; and
in response to determining the plurality of target users, automatically initiate at least one target action for each user of the plurality of target users,
wherein the first plurality of transaction parameters and the second plurality of transaction parameters comprise at least one of: a frequency of transactions, a transaction spend, a consistency of usage, a frequency or amount of electronic commerce transactions, a frequency or amount of airline transactions, a frequency or amount of travel service transactions, a frequency or amount of lodging transactions, a frequency or amount of retail transactions, a frequency or amount of restaurant transactions, a frequency or amount of general retail transactions, a frequency or amount of apparel retail transactions, a frequency of transactions in the at least one second region, a transaction spend in the at least one second region, a consistency of transactions in the at least one second region, past travel behavior, merchant preferences, amount or frequency of seasonal purchases, number of channels though which user has initiated a transaction, spend behavior, or any combination thereof,
wherein the associated weight of each transaction parameter of the first and second plurality of transaction parameters is based on a predicted reliability of the transaction parameter to determine the propensity of a user from the first and/or second subset of users to initiate future transaction activity in the at least one second region.

9. The system of claim 8, further comprising at least one database in communication with the at least one server, the at least one database comprising the transaction data for the portable device transactions initiated by each user of the first subset of users and the second subset of users.

10. The system of claim 8, wherein at least one of the first algorithm and the second algorithm comprises a machine learning algorithm configured to apply at least one predictive model to the transaction data for at least one of each user of the first subset of users and each user of the second subset of users.

11. The system of claim 8, wherein the at least one target action comprises:
identifying at least one offer for each user of the plurality of target users; and
communicating the at least one offer to each user of the plurality of target users.

12. The system of claim 8, wherein the at least one target action comprises approving a user of the plurality of target users for transactions in the at least one second region.

13. The system of claim 8, wherein the at least one target action comprises:
generating at least one list of at least a portion of the plurality of target users associated with a first issuing institution; and
communicating the at least one list to the first issuing institution.

14. The system of claim 8, wherein the at least one second region comprises all countries external to the first region.

15. The system of claim 8, wherein at least one of the first plurality of transaction parameters and the second plurality of transaction parameters comprises at least one external parameter, the at least one external parameter comprising at least one of the following: a change in currency exchange, a holiday or event schedule in at least one of the first region and the at least one second region, a time of year, or any combination thereof.

16. A computer program product for segmenting a plurality of users in a first region comprising at least one country in which the plurality of users reside, the segmenting based on predicted activity external to the first region, the computer program product comprising at least one non-transitory computer-readable medium including program instructions that, when executed by at least one computer comprising at least one processor, cause the at least one processor to:
determine a first subset of users consisting essentially of a first plurality of users from the plurality of users that have previously used a portable device in at least one second region to initiate a transaction at least a predetermined number of times, wherein the at least one second region is external to the first region;
determine a second subset of users consisting essentially of a second plurality of users from the plurality of users that have not previously used a portable device to initiate a transaction in the at least one second region or have used a portable device to initiate a transaction in the at least one second region less than the predetermined number of times;
generate a first activation metric for each user of the first subset of users by applying a first algorithm to transaction data from portable financial device transactions initiated by each user of the first subset of users, the first algorithm based on a first plurality of transaction parameters, each transaction parameter of the first plurality of transaction parameters having an associated weight, wherein the first activation metric represents a determined propensity of a user from the first subset of users to initiate future transaction activity in the at least one second region;
generate a second activation metric for each user of the second subset of users by applying a second algorithm different from the first algorithm to transaction data from portable financial device transactions initiated by each user of the second subset of users, the second algorithm based on a second plurality of transaction parameters, each transaction parameter of the second plurality of transaction parameters having an associated weight, wherein the second activation metric represents a determined propensity of a user from the second subset of users to initiate future transaction activity in the at least one second region, wherein the second algorithm is not applied to the portable financial device transactions initiated by each user of the first subset of users;
determine a plurality of target users from the first subset of users and the second subset of users based at least partially on the first and second activation metrics, the plurality of target users having a determined higher propensity for initiating future transaction activity in the at least one second region compared to non-target users from the first subset of users and the second subset of users; and
in response to determining the plurality of target users, automatically initiate at least one target action for each user of the plurality of target users,
wherein the first plurality of transaction parameters and the second plurality of transaction parameters comprise at least one of: a frequency of transactions, a transaction spend, a consistency of usage, a frequency or amount of electronic commerce transactions, a frequency or amount of airline transactions, a frequency or amount of travel service transactions, a frequency or amount of lodging transactions, a frequency or amount of retail transactions, a frequency or amount of restaurant transactions, a frequency or amount of general retail transactions, a frequency or amount of apparel retail transactions, a frequency of transactions in the at least one second region, a transaction spend in the at least one second region, a consistency of transactions in the at least one second region, past travel behavior, merchant preferences, amount or frequency of seasonal purchases, number of channels though which user has initiated a transaction, spend behavior, or any combination thereof,
wherein the associated weight of each transaction parameter of the first and second plurality of transaction parameters is based on a predicted reliability of the transaction parameter to determine the propensity of a user from the first and/or second subset of users to initiate future transaction activity in the at least one second region.

17. The computer program product of claim 16, wherein at least one of the first algorithm and the second algorithm comprises a machine learning algorithm configured to apply at least one predictive model to the transaction data for at least one of each user of the first subset of users and each user of the second subset of users.

18. The computer program product of claim 16, wherein the at least one target action comprises:
identifying at least one offer for each user of the plurality of target users; and communicating the at least one offer to each user of the plurality of target users.

\* \* \* \* \*